United States Patent
Miyoshi et al.

(10) Patent No.: US 8,438,197 B2
(45) Date of Patent: *May 7, 2013

(54) SYSTEM, APPARATUS, METHOD AND PROGRAM FOR PROCESSING INFORMATION

(75) Inventors: Toshimasa Miyoshi, Kanagawa (JP); Hideo Nagasaka, Kanagawa (JP); Takashi Tominaga, Tokyo (JP); Tadaaki Kimijima, Tokyo (JP); Shigeru Inoue, Tokyo (JP); Soichiro Atsumi, Shizuoka (JP); Mamoru Tokashiki, Tokyo (JP)

(73) Assignee: Sony Corporation, Tokyo (JP)

( * ) Notice: Subject to any disclaimer, the term of this patent is extended or adjusted under 35 U.S.C. 154(b) by 570 days.

This patent is subject to a terminal disclaimer.

(21) Appl. No.: 12/077,557

(22) Filed: Mar. 20, 2008

(65) Prior Publication Data

US 2008/0235268 A1 Sep. 25, 2008

(30) Foreign Application Priority Data

Mar. 23, 2007 (JP) ................................. 2007-077352

(51) Int. Cl.
*G06F 17/30* (2006.01)
(52) U.S. Cl.
USPC ........................................................ 707/827
(58) Field of Classification Search ........................ None
See application file for complete search history.

(56) References Cited

U.S. PATENT DOCUMENTS

| | | | |
|---|---|---|---|
| 6,243,087 B1 | 6/2001 | Davis et al. | |
| 6,477,532 B1 | 11/2002 | Duliege | |
| 6,665,659 B1 | 12/2003 | Logan | |
| 7,626,112 B2 | 12/2009 | Miyajima | |
| 7,716,572 B2 | 5/2010 | Beauregard et al. | |
| 7,793,214 B2* | 9/2010 | Koinuma | 715/234 |
| 2001/0040945 A1 | 11/2001 | Fujino et al. | |
| 2002/0040435 A1 | 4/2002 | Hamada et al. | |
| 2004/0068505 A1* | 4/2004 | Lee et al. | 707/100 |
| 2004/0139318 A1 | 7/2004 | Fiala et al. | |

(Continued)

FOREIGN PATENT DOCUMENTS

| | | |
|---|---|---|
| FR | 2 795 843 A | 1/2001 |
| FR | 2795843 A1 | 1/2001 |

(Continued)

OTHER PUBLICATIONS

Uda, Ryuya et al., "Software-based Music Delivery Platform", Information Processing Society of Japan, Aug. 15, 2000; p. 2237-2245, vol. 41 No. 8, The Information Processing Society of Japan.

(Continued)

*Primary Examiner* — Bai D. Vu
(74) *Attorney, Agent, or Firm* — Wolf, Greenfield & Sacks, P.C.

(57) ABSTRACT

Incidental content as metadata contains one of primary content and usage editing material content information. The primary content has been used directly as an editing material in a secondary usage mode fashion in order to produce the incident content data and the usage editing material content information indicates the incidental content. A generation structure is recognized by back-tracking content serving as a parent by referencing usage editing material content starting with given incidental content, based on the usage editing material content information of each incidental content.

7 Claims, 22 Drawing Sheets

U.S. PATENT DOCUMENTS

| | | |
|---|---|---|
| 2005/0235209 A1 | 10/2005 | Morita et al. |
| 2006/0004669 A1 | 1/2006 | Ito |
| 2006/0036568 A1* | 2/2006 | Moore et al. .................. 707/1 |
| 2006/0294571 A1 | 12/2006 | Moore et al. |
| 2007/0297755 A1 | 12/2007 | Holt et al. |
| 2008/0109483 A1 | 5/2008 | Yoo et al. |
| 2008/0127812 A1 | 6/2008 | Sako et al. |
| 2008/0235268 A1 | 9/2008 | Miyoshi et al. |
| 2008/0235356 A1 | 9/2008 | Miyoshi et al. |
| 2008/0259745 A1 | 10/2008 | Miyajima et al. |
| 2008/0310267 A1 | 12/2008 | Hattori et al. |
| 2009/0106261 A1 | 4/2009 | Nagasaka et al. |
| 2009/0119273 A1 | 5/2009 | Nagasaka et al. |
| 2009/0297128 A1 | 12/2009 | Nagasaka et al. |
| 2009/0299823 A1 | 12/2009 | Nagasaka et al. |
| 2009/0299981 A1 | 12/2009 | Nagasaka et al. |
| 2009/0300036 A1 | 12/2009 | Nagasaki |
| 2010/0036814 A1 | 2/2010 | Kalasapur et al. |
| 2010/0064882 A1 | 3/2010 | Miyajima et al. |
| 2010/0080528 A1 | 4/2010 | Yen et al. |

FOREIGN PATENT DOCUMENTS

| | | |
|---|---|---|
| JP | 2000-040149 A | 2/2000 |
| JP | 2000-048076 A | 2/2000 |
| JP | 2000-113066 | 4/2000 |
| JP | 2001-325387 A | 11/2001 |
| JP | 2002-056015 A | 2/2002 |
| JP | 2002-109103 | 4/2002 |
| JP | 2002-207736 A | 7/2002 |
| JP | 2002-351878 A | 12/2002 |
| JP | 2003-115837 A | 4/2003 |
| JP | 2003-256736 A | 9/2003 |
| JP | 2004-023247 A | 1/2004 |
| JP | 2004-139175 A | 5/2004 |
| JP | 2004-139184 A | 5/2004 |
| JP | 2004-252575 A | 9/2004 |
| JP | 2004-264898 A | 9/2004 |
| JP | 2004-310464 A | 11/2004 |
| JP | 2005-195673 A | 7/2005 |
| JP | 2006-018753 | 1/2006 |
| JP | 2006-146426 A | 6/2006 |
| JP | 2006-190200 | 7/2006 |
| JP | 2006-331189 A | 12/2006 |
| JP | 2007-013911 A | 1/2007 |
| JP | 2008-165837 A | 7/2008 |
| WO | WO 03/067486 A1 | 8/2003 |

OTHER PUBLICATIONS

Tatsuro Mori et al., "Second contents generation type multi-media archive system", Institute of Image Electronics Engineering of Japan Magazine, Institute of Image Electronics Engineers of Japan, Sep. 25, 2002, vol. 31, No. 5, p. 879-891.

* cited by examiner

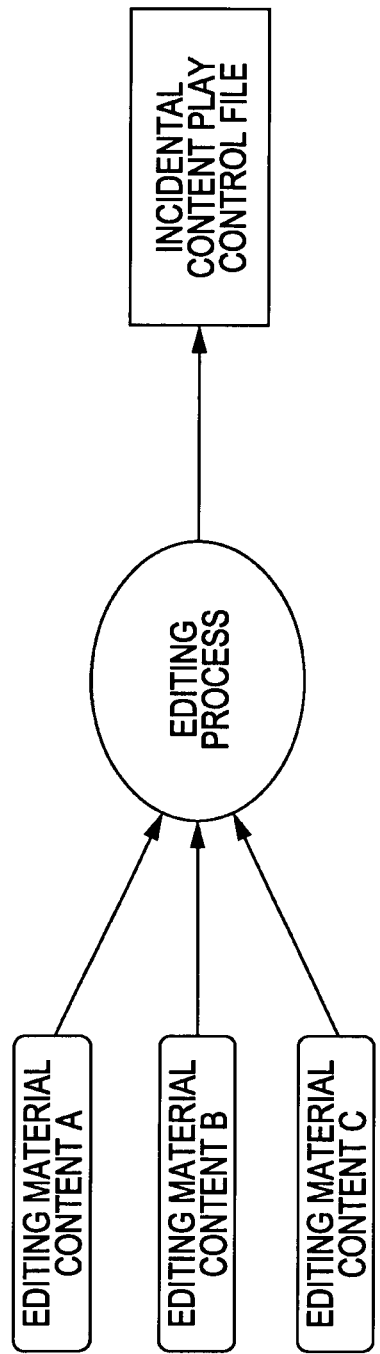

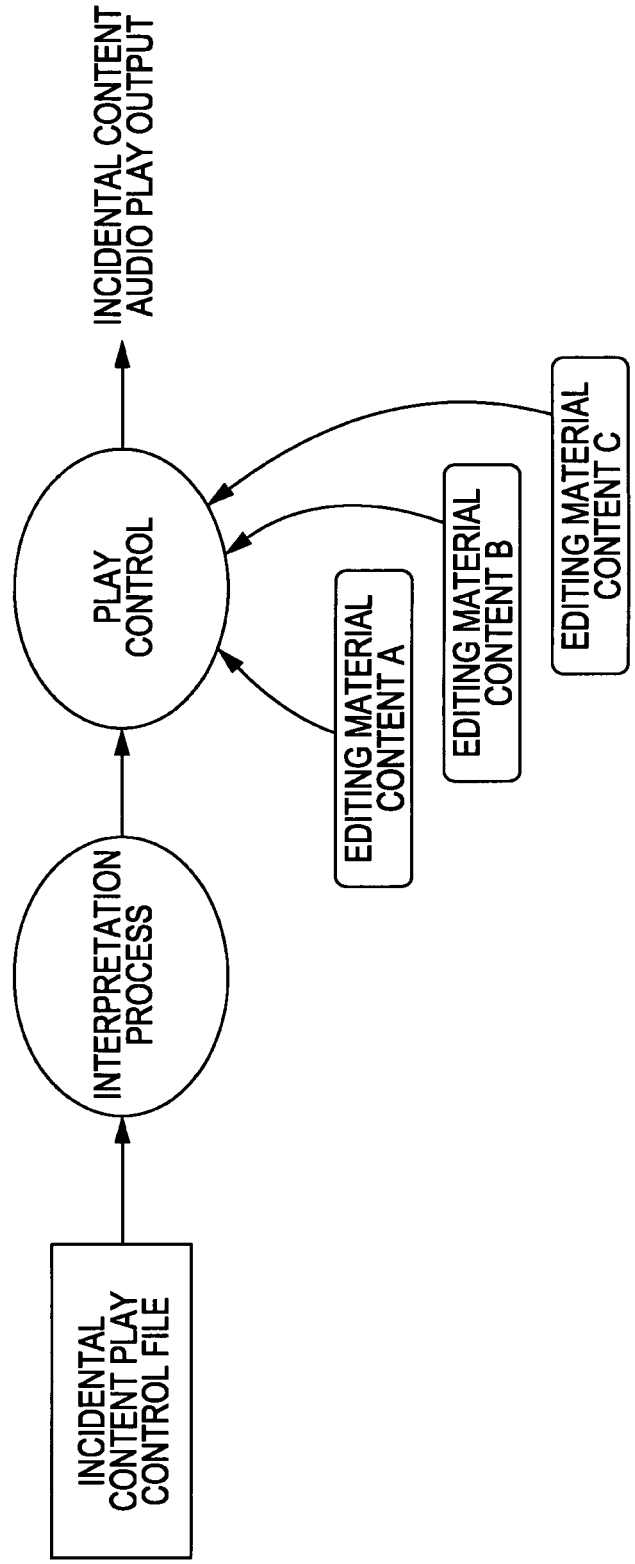

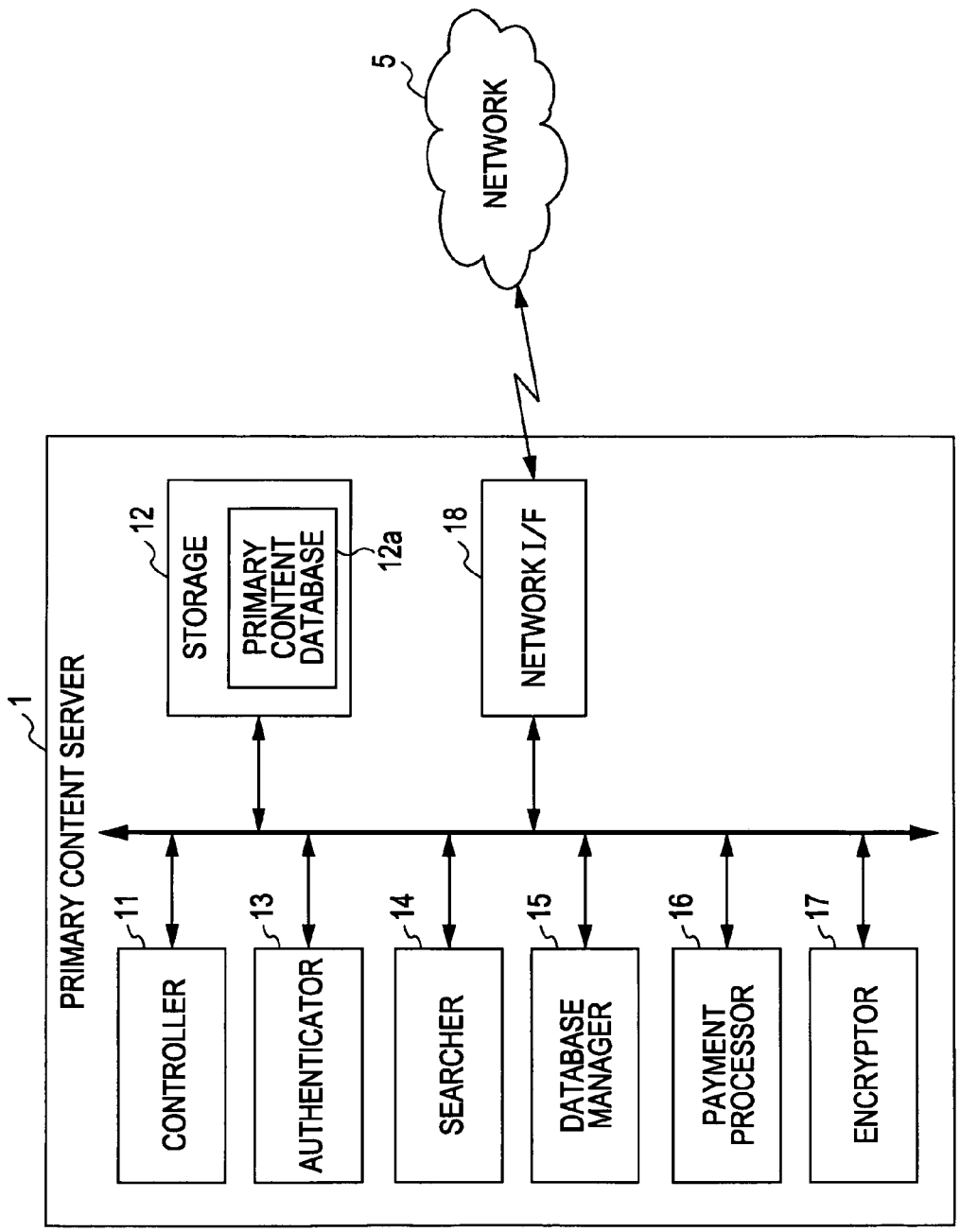

FIG. 13
USAGE PRIMARY CONTENT INFORMATION/
USAGE EDITING MATERIAL CONTENT INFORMATION

UNIT FILE INFORMATION:

| FILE ID | | AAAAAA |
|---|---|---|
| ARTIST NAME | | - - - - |
| SONG NAME | | - - - - |
| GENERATION | | (1 TO N) |
| USAGE PERMISSION RANGE INFORMATION | USAGE ITEM 1 | PERMITTED |
| | USAGE ITEM 2 | UNPERMITTED |
| | ⋮ | ⋮ |
| | USAGE ITEM 3 | PERMITTED |

UNIT FILE INFORMATION:

| FILE ID | | BBBBBB |
|---|---|---|
| ARTIST NAME | | - - - - |
| SONG NAME | | - - - - |
| GENERATION | | (1 TO N) |
| USAGE PERMISSION RANGE INFORMATION | USAGE ITEM 1 | PERMITTED |
| | USAGE ITEM 2 | ONE GENERATION ONLY PERMITTED |
| | ⋮ | ⋮ |
| | USAGE ITEM 3 | UNPERMITTED |

UNIT FILE INFORMATION:

| FILE ID | | CCCCCC |
|---|---|---|
| ARTIST NAME | | - - - - |
| SONG NAME | | - - - - |
| GENERATION | | (1 TO N) |
| USAGE PERMISSION RANGE INFORMATION | USAGE ITEM 1 | UNPERMITTED |
| | USAGE ITEM 2 | PERMITTED |
| | ⋮ | ⋮ |
| | USAGE ITEM 3 | PERMITTED |

FIG. 14

PLAY CONTROL INFORMATION

[
file_id = AAAAAA
time = 00:00 − 00:10
position = vv − zz
]
[
file_id = AAAAAA
time = 00:10 − 00:15
position = ss − tt
]
[
file_id = BBBBBB
time = 00:15 − 00:20
position = pp − uu
]

.
.
.

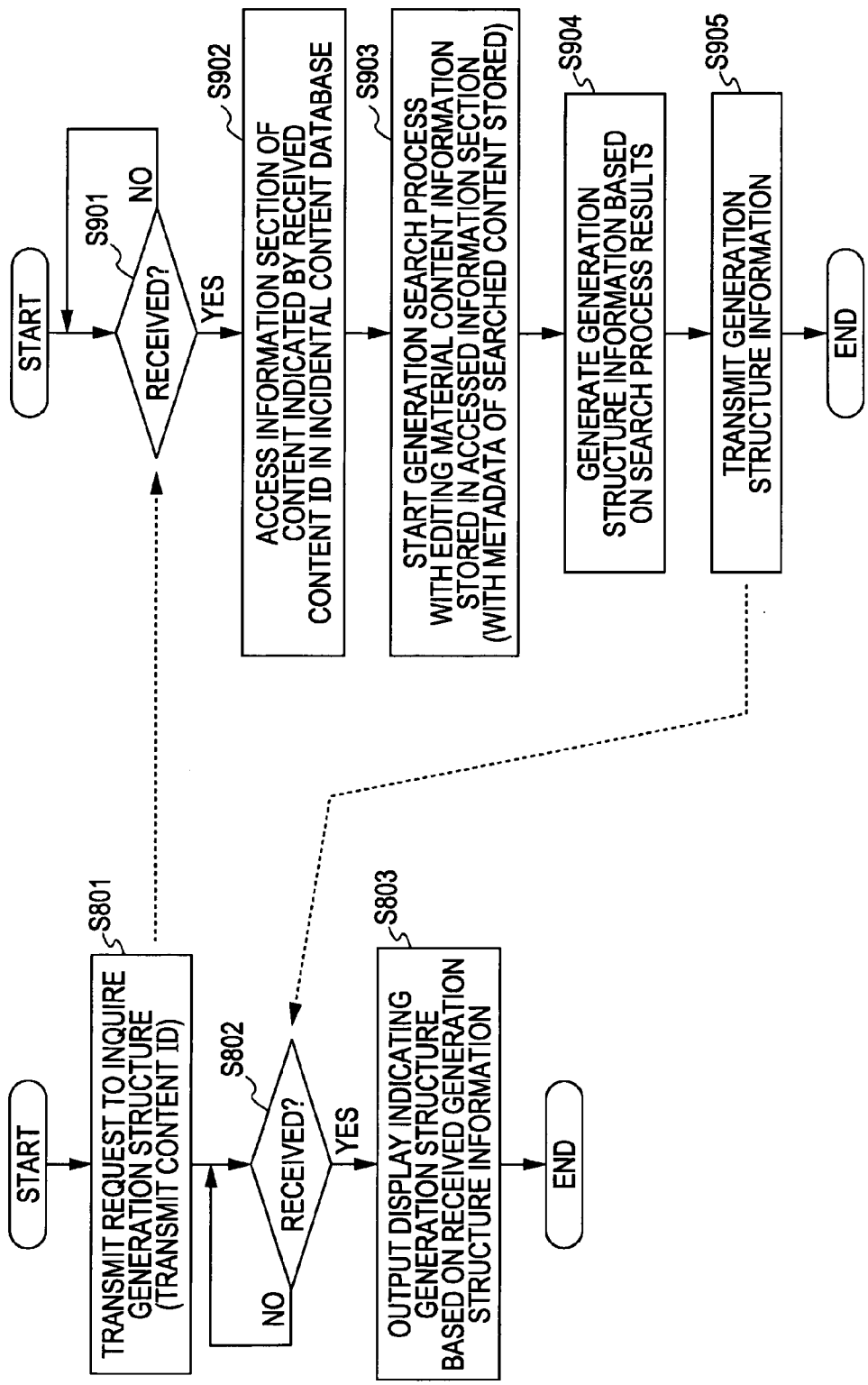

SYSTEM, APPARATUS, METHOD AND PROGRAM FOR PROCESSING INFORMATION

CROSS REFERENCES TO RELATED APPLICATIONS

The present invention contains subject matter related to Japanese Patent Application JP 2007-077352 filed in the Japanese Patent Office on Mar. 23, 2007, the entire contents of which are incorporated herein by reference.

BACKGROUND OF THE INVENTION

1. Field of the Invention

The present invention relates to an information processing system for allowing music to be delivered via a network and a file to be shared via the network, an information processing apparatus contained in the information processing system and a computer program executed by the information processing apparatus.

2. Description of the Related Art

In one application of networks, audio and video content is delivered and shared by users. In the case of an audio content delivery system, for example, a data file containing large number of pieces of content is stored and managed in a server. A user having an information processing terminal, such as a personal computer, operates application software (client software) having a client function for content delivery, thereby downloading a data file of desired content. The data file downloaded as the audio content is typically stored and managed on a storage device in the information processing terminal by the user. The user can thus enjoy video using the client software to play the data file as the content stored on the information processing terminal.

In a content sharing system, the user of the information processing terminal uploads to a server the data file as the audio and video content. The user having uploaded the content receives, from the server, information such as uniform resource locator (URL) where the uploaded data file is stored and notifies acquaintances of the URL. An acquaintance who is notified of may access the URL using his own information processing terminal and thus the uploaded content.

The server in such a content sharing system has a web page where the uploaded content is disclosed. An ordinary user having an information processing terminal accesses the site for searching for content of interest. The ordinary user then views the content by accessing the hit content. The content is thus shared.

In one environment for playing shared content, downloaded content may be stored on an auxiliary memory device in the information processing terminal and the stored content data is played. Alternatively, the content may be stream-played rather than storing locally on the auxiliary memory device.

The technique called peer-to-peer (P2P) is known. Using P2P, information processing terminals exchange data files of content are exchanged over a network, thereby sharing the data file of content over the network.

Also known as application software (editing software) is the one that retrieves audio data and video data as a material and arranges and edits the material to produce a new song. Recently, such application software having a simple to a complex structure is in widespread use among not only specialists for music production but also an ordinary person.

The editing software modifies read data as content (such as audio and video data) for editing. For example, sampling and mashup are performed on audio data so that part of existing music is easily acquired and edited. In practice, professional musicians have released a lot of music produced using such a technique. Reference is made to Japanese Unexamined Patent Application Publication No. 2000-113066.

SUMMARY OF THE INVENTION

Under these circumstances, some users may wish not only enjoy merely data of the delivered or shared content but also create new content by performing a secondary editing process using the editing software and release the created content to the public.

In accordance with one embodiment of the present invention, a content delivery and sharing system constructed on a network system is provided to satisfy the above-described users' needs. In the content delivery and sharing system, data of content downloaded from a server and acquired on a user terminal is edited in a secondary usage mode to produce incidental content. The produced content is then disclosed on the server. A value-added content delivery and sharing system thus results.

In accordance with one embodiment of the present invention, an information processing system, includes, at least, an incidental content server and a terminal, communicating with each other via a network. The incidental content server includes an incidental content information storage unit for storing incidental content information, the incidental content information containing main information and additional information, the main information substantially containing incident content to be played and the additional information containing direct usage content information indicating direct usage content that has been directly used in a secondary usage mode in production of the incidental content. The terminal includes an edit processing unit for performing an edit process by using in a secondary usage mode at least one data unit of content locally present and likely to be the incidental content, an incidental content information generating unit for generating incidental content information containing new content based on editing results of the edit processing unit, a content information upload control unit for causing the terminal to transmit the incidental content generated by the incidental content information generating unit to the incidental content server via the network in order to store the incidental content on the incidental content information storage unit, and a generation search unit for searching a parent-child relation of the direct usage content starting with particular incidental content to a predetermined generation, by referencing the direct usage content information of the incidental content information stored on the incidental content server, the incidental content and the direct usage content thereof being handled as the parent-child relation.

The direct usage content is "content that has been used in a secondary usage mode to produce the incidental content" and the incidental content itself is obtained by "using at least one unit of content data locally present and likely to be incidental content." More specifically, content that is used in a secondary usage mode to produce the incidental content may be content produced originally instead of in a secondary usage mode (corresponding to primary content to be discussed later) or another incidental content.

In accordance with one embodiment of the present invention, an information processing apparatus, includes a communication unit for communicating via a network, an incidental content information storage unit for storing incidental content information, the incidental content information containing main information and additional information, the main information substantially containing incident content that has been produced by performing an edit process by using in a secondary usage mode at least one piece of content and the additional information containing direct usage content information indicating direct usage content that has been directly used in a secondary usage mode in production of the incidental content, a storage control unit for causing the incidental content information storage unit to store received incidental content information in response to reception of the incidental content information uploaded via the network, and a generation search unit for searching a parent-child relation of the direct usage content starting with particular incidental content to a predetermined generation, by referencing the direct usage content information of the incidental content information stored on the incidental content server, the incidental content and the direct usage content thereof being handled as the parent-child relation.

The terminal can produce new incidental content using content data locally present thereon in a secondary usage mode. Content used in a secondary usage mode may be incidental content. In other words, new incidental content may be produced using the incidental content in a secondary usage mode. The incidental content thus produced may be transmitted to the incidental content server. If the incidental content server has the function of disclosing publicly the incidental content stored thereon, a system is embodied which permit the incidental content produced on the terminal to be disclosed by uploading the produced incidental content to the incidental content server.

The generation searching unit can back-track the parent-child relation of the direct usage content starting with one piece of incidental content present in the system. The information processing apparatus can back-track the generation structure of the parent-child relation of the direct usage content to a previous generation starting with one given piece of incidental content.

In accordance with a network system of embodiments of the present invention, the terminal produces the incidental content by editing in a secondary usage mode the data of the content on the terminal and uploads the produced incidental content to the server to disclose publicly the produced incidental content. In the system, the generation structure of the direct usage content starting with one given piece of incidental content is recognized. The network system of embodiments of the present invention provides a variety of services based on the information regarding the generation structure. A value-added network system thus results.

BRIEF DESCRIPTION OF THE DRAWINGS

FIG. 3 diagrammatically illustrates incidental content generated by a user terminal in accordance with one embodiment of the present invention;

FIG. 4 diagrammatically illustrates incidental content played by the user terminal in accordance with one embodiment of the present invention;

FIG. 6 illustrates an internal structure of a primary content server in accordance with one embodiment of the present invention;

FIG. 13 diagrammatically illustrates a structure of usage primary content information and usage editing material content information in the incidental content play control file in accordance with one embodiment of the present invention;

FIG. 14 illustrates play control information in the incidental content play control file in accordance with one embodiment of the present invention;

FIG. 23 is a flowchart illustrating a process of a generation structure information providing service in the music delivery and sharing system in accordance with one embodiment of the present invention.

DESCRIPTION OF THE PREFERRED EMBODIMENTS

Figure 1:
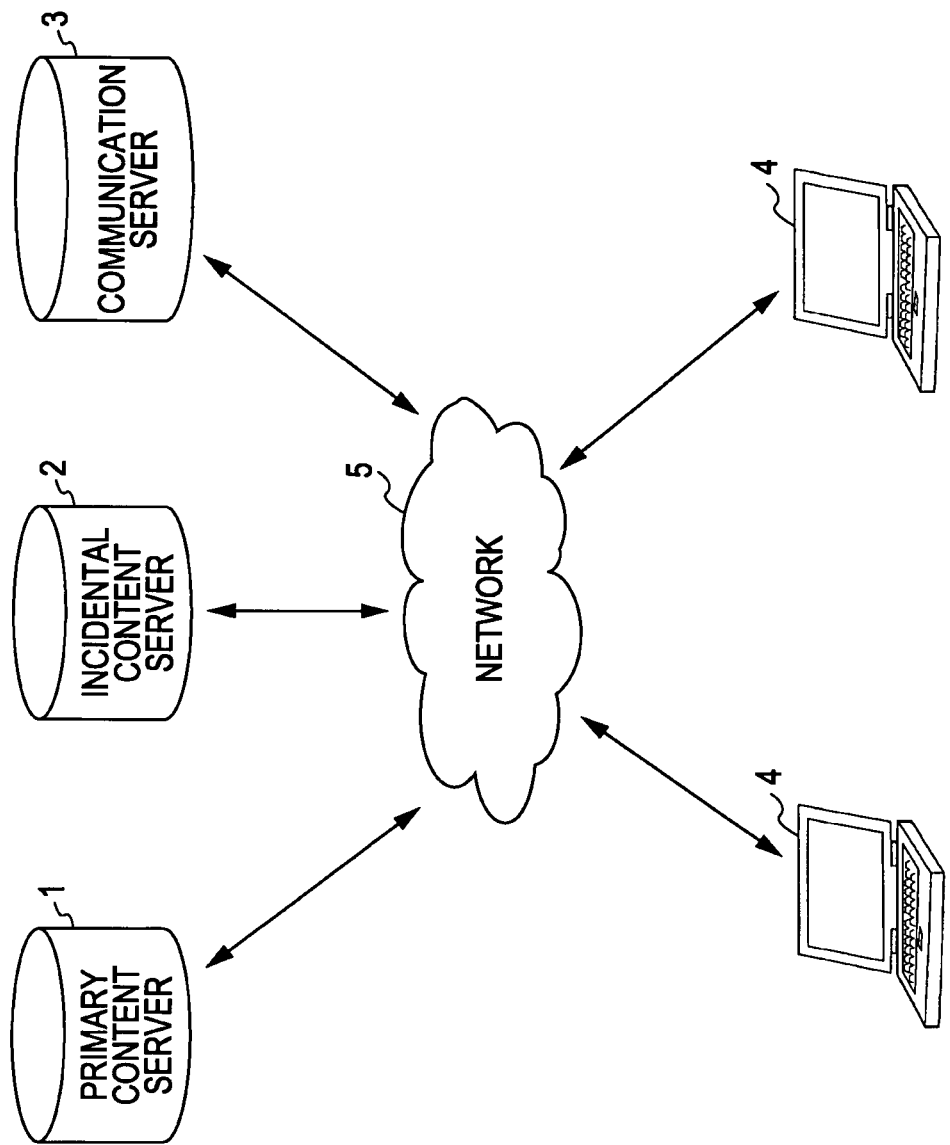
FIG. 1 illustrates a system configuration of a music editing and sharing system in accordance with one embodiment of the present invention.

FIG. 1 illustrates an information processing system in accordance with one embodiment of the present invention.

As shown in FIG. 1, the information processing system includes a primary content server 1, an incidental content server 2, a communication server 3, and a large number of user terminals 4, each linked to the other via a network 5.

The information processing system of one embodiment of the present invention forms a music delivery and sharing system. More specifically, music (primary content) and content (incidental content) produced by users are shared among users.

The primary content server 1 stores a great deal of audio content data in a predetermined format as primary content and manages the audio content data in the form of a database. In response to a download request from the user terminal 4, the primary content server 1 outputs audio data as specified primary content to the user terminal 4.

The audio data as the primary content may be a song played an artist and supplied by an affiliate label company, for example.

The incidental content server 2 stores data of a large number of incidental content play control files as the incidental content and manages the data in the form of a database.

The incidental content play control file may be uploaded from the user terminal 4 to the incidental content server 2 via a network. The incidental content server 2 stores the incidental content play control files thus uploaded as the incidental content. In response to a download request from the user terminal 4 via the network, the incidental content server 2 transmits the requested incidental content play control file to the user terminal 4.

The communication server 3 also provides information service operated by individual users and user-to-user communication service, also referred to as consumer generated media (CGM) including social networking service (SN) or blog.

The user terminal 4 is a network device used by an individual user. In practice, the user terminal 4 is a personal computer having a network communication function with local area network (LAN).

An application program as a music editing and sharing application 100 is installed on the user terminal 4. By operating the music editing and sharing application 100, the user can download primary content from the primary content server 1, and generate new incidental content by performing an editing process on the downloaded primary content (and the incidental content). The user also can upload to the incidental content server 2 generated incidental content (i.e., an incidental content play control file), download an incidental content (incidental content play control file) from the incidental content server 2, use an SNS service using the communication server 3, and write and browse a blog.

Figure 2:
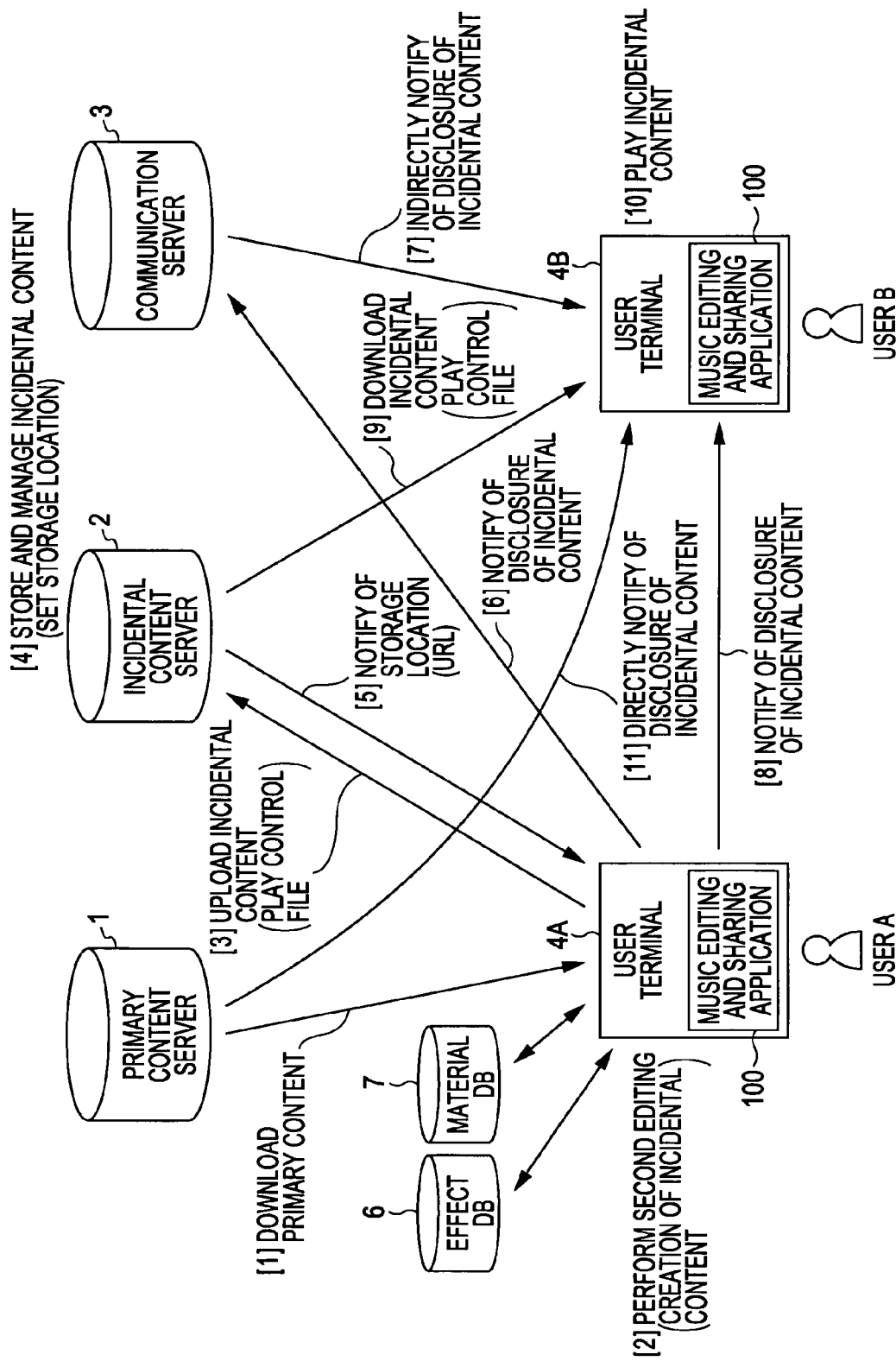
FIG. 2 illustrates a basic usage of and system operation of the music editing and sharing system in accordance with one embodiment of the present invention.

Basic operation of the information processing system of one embodiment of the present invention of FIG. 1 is described below with reference to FIG. 2 in accordance with a basic usage mode of the user of the user terminal 4. With reference to FIG. 2, the information processing system is described in the order of procedure numbers (enclosed in brackets [ ]) in FIG. 2. User terminals 4A and 4B respectively operated by users A and B are illustrated in FIG. 2. FIG. 2 does not illustrate the network 5 actually present between the primary content server 1, the incidental content server 2, the communication server 3 and the user terminal 4.

Procedure 1

The user A searches on the user terminal 4A (music editing and sharing application 100) for primary content the user desires to download. The user A performs an operation to download the hit primary content. In response to the operation, the user terminal 4A transmits a download request to the primary content server 1.

Downloading of each primary content is a fee-based service in principle in the music editing and sharing system of one embodiment of the present invention. When a download request is transmitted to the primary content server 1, the user A needs to perform a predetermined purchase transaction. The purchase transaction may be based on a per song fee basis or on a per album fee basis. The purchase transaction may be performed on a subscription basis. The subscription purchase is more and more widely accepted recently. Alternatively, the incidental content may be supplied free of charge. In such a case, the user A does not need to perform any purchase transaction.

Upon receiving the download request, the primary content server 1 authenticates the requesting user and verifies fee payment status in order to determine whether the download request is valid. If it is determined that the download request is valid, the primary content server 1 searches for incidental content requested in the download request out of the incidental content stored thereon and transmits data of the hit primary content (primary content data) to the user terminal 4 as a requesting terminal. The substantial body of the primary contents stored and managed by the primary content server 1 has a file structure containing, as main information, audio data in a predetermined format containing song as a primary content (data for playing the primary content) and a variety of metadata related to the primary content (such as a song title, an artist, a title of an album, genre, a data format, and a data size). In the discussion that follows, the main body of the primary content data is digital audio data, from which the corresponding song results when played.

The primary content data output from the primary content server 1 is received by the user terminal 4A. The user terminal 4A (music editing and sharing application 100) stores the received primary content data on a recording medium such as an internal hard disk drive (HDD). The music editing and sharing application 100 manages the thus stored primary content data in a predetermined structure based on metadata while playing the primary content in response to a user operation input.

The primary content data stored on the primary content server 1 is purchased by the user in principle, and then downloaded to the user terminal 4. In the procedure 1, music is delivered.

The primary content data stored on the user terminal 4A is played by the music editing and sharing application 100 and the user can listen to the song from an audio device connected to the user terminal 4A.

Procedure 2

In music delivery over the network, use of downloaded music is limited to playing with part of digital audio data copy protected. In other words, a user having downloaded audio content is permitted to use the audio content only within a certain range. For example, the user is not authorized to produce a song by arranging the downloaded audio content as a secondary creation.

In accordance with one embodiment of the present invention, the primary content is audio content. The user is permitted to use the primary content (in a secondary use and edit) for a secondary creation within a predetermined range. The secondary use of the primary content in one embodiment of the present invention is set within a range authorized by an original creator of a song as primary content.

The music editing and sharing application 100 of one embodiment of the present invention uses the primary content managed thereby (stored thereon) in a secondary usage mode fashion and performs an editing process in response to the user operation input. The music editing and sharing application 100 thus produces audio content as a new song. When such audio content is edited, plug-in data having a predetermined special effect available in an effect database (DB) 6 is retrieved and used. Similarly, an audio material available in a material database 7 may be retrieved and added in the editing process. The effect database 6 and material database 7 may be arranged on the network or locally on the user terminal 4A.

The audio content thus produced is now referred to as incidental content different from the primary content. In the procedure 2, the user produces a single piece of incidental content by operating the user terminal 4A with the music editing and sharing application 100 running.

The substantial body of the incidental content produced in the procedure 2 is not digital audio data having music such as the primary content but play control information. The play control information contains an instruction to play what portion of the digital audio data as the audio content used in a secondary usage mode fashion (editing material content) at which timing and an instruction for special effects.

FIG. 3 diagrammatically illustrates a secondary editing process performed by the music editing and sharing application 100. Editing material contents A, B and C to be used in a secondary usage mode fashion are edited in response to user operation input. Incidental content play control information composed of the play control information rather than the audio data is thus output.

The incidental content data (incidental content play control information) as the play control information is substantially smaller in data size than the audio data. A memory capacity of a recording medium such as a hard disk storing the incidental content data is saved and effectively used in the incidental content server 2. When the incidental content data is exchanged over the network, the transmitted data remains small in data size and resulting traffic remains light.

Existing songs are edited to produce a secondary work as a new song in the second editing process of one embodiment of the present invention. Such a secondary creation is frequently performed by professional musicians in sampling or mashup. Under these circumstances, it is only natural that an ordinary user may wish to produce a song as a secondary creation. In practice, an ordinary user has difficulty producing a song as a secondary creation even if the problem of copyright is cleared.

The music delivery and sharing system of one embodiment of the present invention allows an ordinary user to perform a secondary editing process in a legally acceptable method using the delivered song. The music delivery and sharing system can thus provide a high degree of entertainment in the delivered content.

The primary content is defined as audio content the user has purchased and permitted to use in a secondary usage mode fashion within a range authorized by the copyright holder. The music delivery service of the primary content server 1 of one embodiment of the present invention delivers the audio content the copyright holder positively permits to be used. In accordance with one embodiment of the present invention, the editing process for the secondary use of the primary content is limited to the user operation on the music editing and sharing application 100 developed for the music delivery and sharing system. For example, the editing process cannot be performed using another editing software unrelated to the music delivery and sharing system of the embodiment of the present invention. A mechanism for such a limitation will be described later.

Procedure 3

The incidental content play control file produced as the incidental content by the user A in accordance with the procedure 2 is stored on only the user terminal 4A of the user A. As will be described later with reference to FIG. 4, the sound of the song is played as the incidental content in accordance with the play function of the music editing and sharing application 100.

In accordance with one embodiment of the present invention, the incidental content produced by the user is disclosed over the network. Users who receive the service of the music editing and sharing application 100 can share the incidental content.

The user A may wish to share the incidental content produced in accordance with the procedure 2. The user A then performs a predetermined operation on the music editing and sharing application 100, thereby uploading the incidental content produced in accordance with the procedure 2 to the incidental content server 2. That procedure is a procedure 3.

As previously discussed, the body of the incidental content is an incidental content play control file. In the upload process of the incidental content in the procedure 3, the user terminal 4A (music editing and sharing application 100) outputs the incidental content play control file together with an upload request.

Procedure 4

In response to the upload request as described above, the incidental content server 2 stores on a database as a new registration the incidental content play control file as the incidental content received together the request. The incidental content server 2 sets a storage location (for example, uniform resource locator (URL)), stores the incidental content play control file to register the incidental content play control file on the database thereof.

The incidental content server 2 has a disclosure function of disclosing the incidental content registered on the database. More specifically, the incidental content server 2 discloses the incidental content by presenting a list of incidental content units registered on the database in response to an access from the user terminal 4 (music editing and sharing application 100). The incidental content server 2 can transmit the disclosed incidental content in response to a download request from the user terminal 4 (music editing and sharing application 100) as will be described later.

Procedure 5

Upon storing and managing the incidental content play control file, the incidental content server 2 transmits an address (a storage location address) indicating a storage location of the uploaded incidental content (incidental content play control file) to the user terminal 4A. The user terminal 4A has issued the upload request.

The music editing and sharing application 100 of the user terminal 4A receives the storage location address, and stores and manages the storage location address on a predetermined recording medium. The user A can now output the storage location address of the incidental content uploaded in the procedure 2 by performing a predetermined operation on the music editing and sharing application 100.

Procedure 6

The user A having retrieved the storage location address described above can notify another user using one of several means that the incidental content of the user A has been disclosed by the incidental content server 2.

Procedure 6 is one of the disclosure notification means. As shown in FIG. 2, the user A accesses the communication server 3 in order to write on his own page in SNS or his own blog a message indicating that the incidental content produced by the user A himself is disclosed. The storage location address acquired as a URL in the procedure 5 is labeled together with the message.

Procedure 7

After the user A has written the message in the procedure 6, the user B may operate the music editing and sharing application 100 installed on the user terminal 4B and access the page of the user A in SNS or the blog of the user A for viewing. This means that the incidental content of the user A is newly disclosed. More specifically, the user B is indirectly notified of the new disclosure of the incidental content of the user A via the SNS or the blog. Procedure 7 indicates that the notification of the disclosure of the incidental content has been performed.

Procedure 8

Procedure 8 is one of the disclosure notification means. In the procedure 8, the user A produces and transmits an e-mail using a mail function of the SNS, thereby notifying the user B that the incidental content produced by the user A himself has been disclosed. The procedure 8 is more direct notification than the notification performed in the procedures 6 and 7.

In the notification of using the e-mail, the storage location address of the incidental content may be labeled on the text of the e-mail.

Procedure 9

The user B receives directly or indirectly the notification that the incidental content produced by the user A has been newly disclosed and can learn the newly disclosed incidental content. The user B may wish to listen to the newly disclosed incidental content of the user A. The user B then downloads the incidental content using the music editing and sharing application 100 in procedure 9.

To download the incidental content, the user B clicks the storage location address displayed as a link to the diary page of the SNS or the text of the blog. It is noted that if an address such as a URL is written on the diary page of the SNS or the blog, the corresponding character train is disclosed as a link.

In response to the clicking operation to the storage location address, the music editing and sharing application 100 accesses the storage location address. More specifically, the music editing and sharing application 100 accesses an address indicating the storage location of the file of the incidental content produced by the user A and disclosed (incidental content play control file) from among the addresses on the incidental content server 2. The user terminal 4B receives the incidental content play control file and the received incidental content play control file is managed under the control of the music editing and sharing application 100. The incidental content is downloaded in this way.

Procedure 10

The incidental content produced by the user A is stored and managed as described above. The music editing and sharing application 100 in the user terminal 4B can now play the incidental content. In procedure 10, the song as the incidental content is played in response to a play command operation applied to the music editing and sharing application 100.

FIG. 4 illustrates a play concept of the incidental content played by the music editing and sharing application 100.

To play the incidental content, the music editing and sharing application 100 interprets the incidental content play control file as a data body. The interpretation results may clarify what audio content is used as an editing material content, what portion of each editing material content is used, how long play time is, and how the editing material content is used, etc. As FIG. 3, FIG. 4 also illustrates audio content of the editing material content A, B and C used. In accordance with the interpretation results, the music editing and sharing application 100 performs play control using real audio data as the editing material content A, B and C. As a result, the song as the incidental content is output in sound.

With reference to FIG. 4, real audio data used as auxiliary audio content (editing material content) in the incidental content is necessary. More specifically, to play the incidental content, the real audio data of the editing material content needs to be present locally together with the music editing and sharing application 100 at least temporarily. If an attempt is made to play the incidental content with no editing material content present locally, the editing material content needs to be retrieved and present locally.

Procedure 11

In the above case, the editing material content, still unpresent locally, is downloaded in procedure 11. The procedure 11 of FIG. 2 is performed in the process of the content playing in the procedure 10.

From the aforementioned discussion, the editing material content is real audio data. The editing material content is thus primary content. In the procedure 11, the user terminal 4B accesses the primary content server 1 in order to download the primary content that is necessary to play the incidental content in the procedure 10 and still unpresent locally. After the download of the primary content, the editing material content needed to play the incidental content is locally present. The play operation is thus normally performed as shown in FIG. 4.

Several cases of the audio data of the primary content locally present as a result of the download in the procedure 11 are considered.

In one case as in a normal download process in the procedure 1, the primary content can be locally present in a storage state on an auxiliary recording device such as a hard disk drive (HDD). In another case, the primary content is temporarily stored on a main memory device such as a RAM and is then deleted when the music editing and sharing application 100 becomes disabled to play the incidental content. For example, the primary content is supplied in a fee-based service in principle as previously discussed. In the second case, the primary content may be supplied free of charge or for a fee set to be lower than in a standard download service.

Figure 5A:
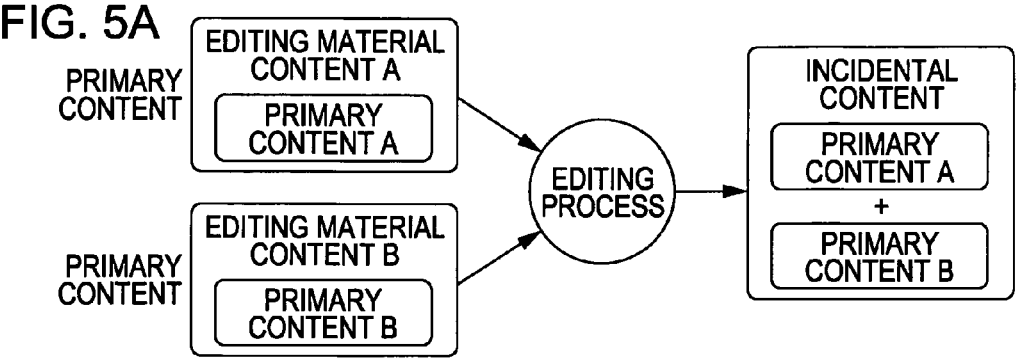
FIGS. 5A-5C illustrate usage modes of editing material content in the generation of the incidental content.
Figure 5B:
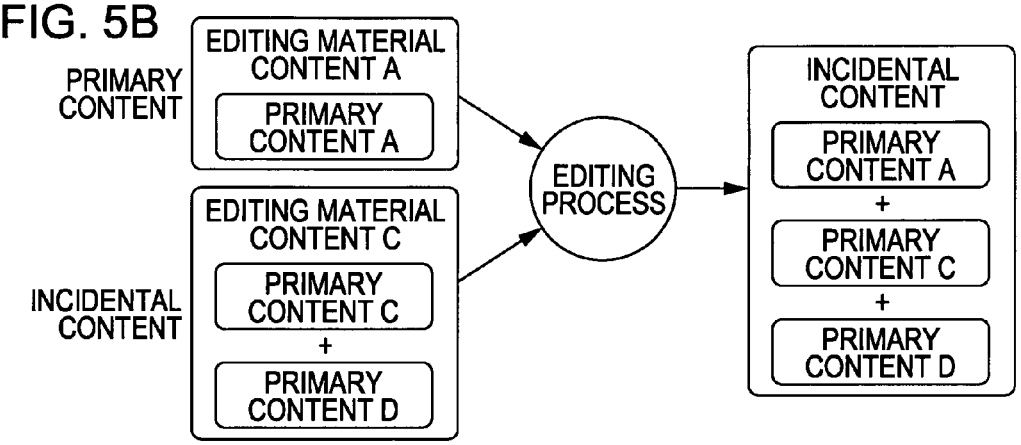
Figure 5C:
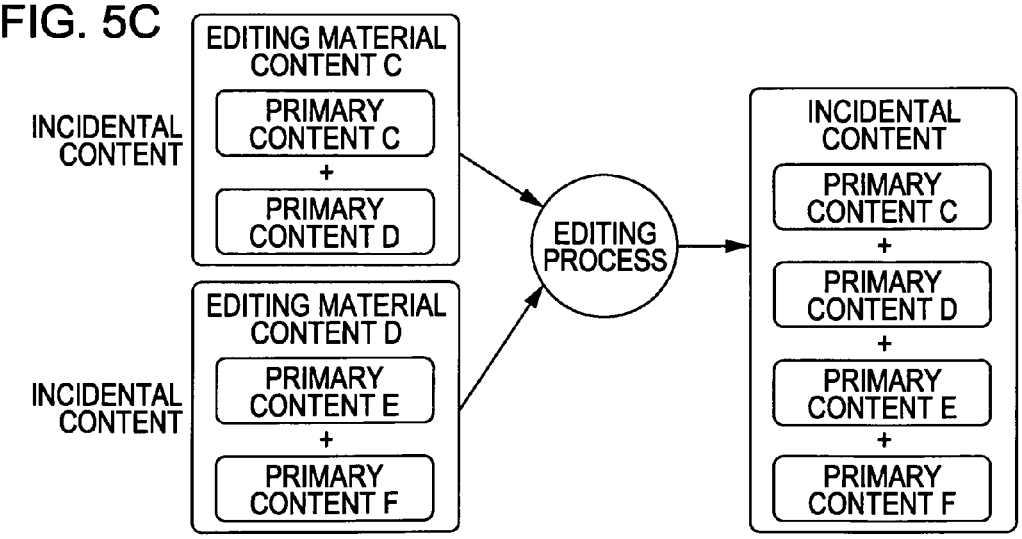

With reference to FIG. 2, the incidental content of the present embodiment is produced using the primary content as editing material content. Alternatively, the editing material content may include not only the primary content but also the incidental content. This is further discussed with reference to FIGS. 5A-5C. FIGS. 5A-5C illustrate a case in which a single piece of incidental content is produced using two pieces of editing material content in a secondary usage mode fashion.

FIG. 5A illustrates a case in which each of editing material content A and editing material content B is primary content as in the production case of the incidental content discussed with reference to FIG. 2. More specifically, the editing process is performed to produce the incidental content with primary content A being the editing material content A and the primary content B, different from the primary content A, being the editing material content B. As shown in FIGS. 5A-5C, the incidental content contains at least part of each of the primary content A and the primary content B. In other words, the primary content A and B is used as a basic editing material (original editing material).

FIG. 5B illustrates an incidental content that is produced by editing the same editing material content A as the primary content of FIG. 5A and editing material content C that has been produced by using primary contents C and D in a secondary usage mode fashion. The incidental content in this case contains part of the primary content A contained in the editing material content A and part of each of the primary contents C and D contained in the editing material content C. More specifically, the original editing content is primary contents A, C and D. To play new incidental content illustrated in FIG. 5B, it is necessary to place locally the primary content A, C and D.

FIG. 5C illustrates that the editing of two pieces of editing material content C and D as incidental content results in new incidental content. The newly produced incidental content contains part of each piece of primary content C and D contained in the editing material content C and part of each piece of primary content E and F contained in the editing material content D. To play the new incidental content of FIG. 5C, the primary content C, D, E and F as the original editing materials needs to be locally stored.

When the incidental content is used as the editing material content to produce incidental content as shown in FIGS. 5B and 5C, the user stores locally the incidental content as the editing material content in the same manner as when the primary content is handled as an editing material content. To this end, the user downloads the incidental content and stores the downloaded incidental content on the user terminal 4.

When the incidental content server 2 transmits the incidental content data in response to the download request of the incidental content, the incidental content data is encrypted. The encrypted data can be decrypted by the music editing and sharing application 100. The music editing and sharing application 100 plays only the incidental content data that is obtained using the encryption process. For example, the music editing and sharing application 100 is designed not to play incidental content data originally not encrypted at all and incidental content data encrypted with a different method or algorithm. In other words, the music editing and sharing application 100 plays only the incidental content downloaded from the incidental content server 2.

Users may exchange incidental content files in P2P (peer to peer) network communication, e-mail, or file transport protocol (FTP) or exchange incidental content files using a removable medium. A file obtained in such a way cannot be played because the file has not been encrypted by the incidental content server 2. In accordance with the present embodiment, incidental content produced by someone else can be properly played only when the incidental content is downloaded from the incidental content server 2. The music delivery and sharing system of the present embodiment prevents any illegal incidental content violating the copyright laws from being circulated and proliferated over the network. The rights of the copyright holders of the primary content and the incidental content are thus protected.

With reference to FIGS. 2 through 4 and FIGS. 5A, 5B and 5C, the music delivery and sharing system of the present embodiment allows the primary content to be downloaded (purchased) first. In other words, the user can enjoy listening to the user's own favorite songs through standard music delivery. Use right is set on primary content to permit secondary use and the user edits the primary content as an editing material to produce the user's own content. The incidental content thus produced is publicly disclosed using communication techniques such as SNS and blog. An ordinary user edits a copyrighted song, produces new audio content (incidental content), and publicly discloses the incidental content in an appropriate manner. Such a process was difficult to perform legally due to the copyright laws.

In accordance with the present embodiment, the body of the incidental content is the play control information containing at least a description of an instruction to play the primary content as an original editing material.

The music editing and sharing application 100 has not only the play function of the incidental content but also the edit function of producing the incidental content. The music editing and sharing application 100 thus performs not only the process of playing sound of the incidental content but also accounts for the edit content of the incidental content to be played, in a user interface of the edit function. Since the incidental content contains the play control information, the user can learn in detail how the downloaded incidental content has been edited, using the edit function of the music editing and sharing application 100.

A structure of the music delivery and sharing system discussed above is described below.

FIG. 6 illustrates an internal structure of the primary content server 1. The primary content server 1 includes a controller 11, a storage 12, an authenticator 13, a searcher 14, a database manager 15, a payment processor 16, an encryptor 17 and a network interface 18.

The controller 11 generally controls each element of the primary content server 1.

The storage 12, including a hard disk drive (HDD), stores a primary content database 12*a*. The primary content database 12*a* manages audio data files as the primary content in the form of database. The audio data file as the primary content contains, in a predetermined format, audio data as real data and a variety of metadata attached thereto.

In response to a download request, the authenticator 13 uses one of a user ID and a password contained in the request, thereby performing an authentication process to determine whether the user is authentic. Only if authentication results show that the user is authentic, the primary content is transmitted in response to the request.

In cooperation with the database manager 15, the searcher 14 accesses the primary content database 12*a*, thereby searching for the target primary content.

The database manager 15 manages the primary content database 12*a*. When new primary content is supplied, the database manager 15 updates the primary content database 12*a* to register the new primary content. When primary content is to be deleted, the database manager 15 deletes the primary content and updates the primary content database 12*a* accordingly.

The payment processor 16 performs a user payment process related to fee-based primary content.

The encryptor 17 performs a predetermined encryption process to the primary content to be transmitted from the primary content server 1 to the user terminal 4.

The network interface 18 performs a communication process via the network 5. For example, the network interface 18 under the control of the controller 11 receives the download request and transmits the primary content in response to the request.

Figure 7:
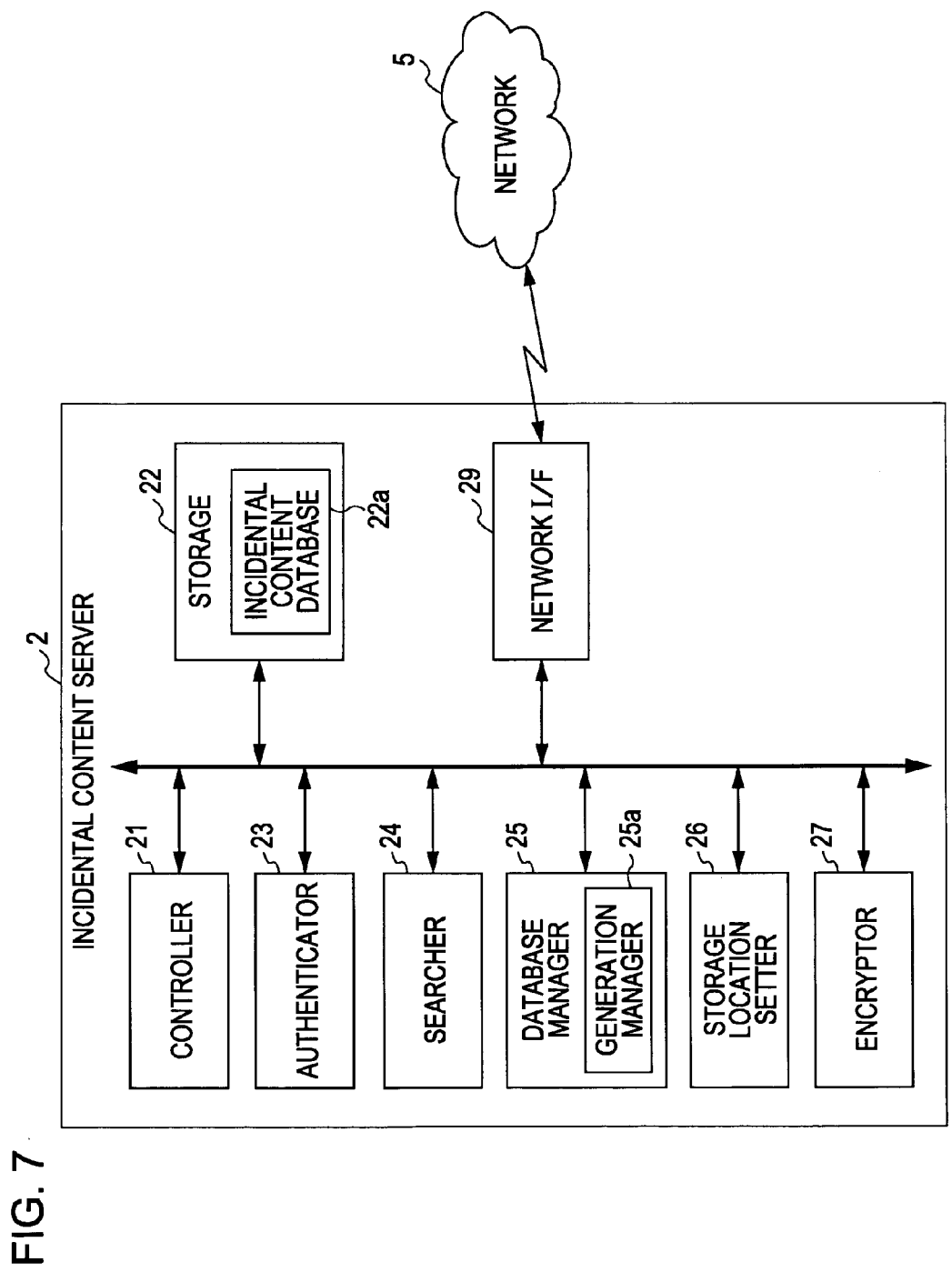
FIG. 7 illustrates an internal structure of an incidental content server in accordance with one embodiment of the present invention.

FIG. 7 illustrates an internal structure of the incidental content server 2. As shown in FIG. 7, the incidental content server 2 includes a controller 21, a storage 22, an authenticator 23, a searcher 24, a database manager 25, a storage location setter 26, an encryptor 27, and a network interface 29.

The controller 21 generally controls each element in the incidental content server 2.

The storage 22, including an HDD, stores an incidental content database 22*a*. The incidental content database 22*a* is real data as incidental contents to be disclosed and includes incidental content play control files in the form of database.

In response to a download request of the incidental content, the authenticator 23 uses one of a user ID and a password contained in the request, thereby performing a predetermined authentication process to determine whether the user is authentic.

In cooperation with the database manager 25, the searcher 24 accesses the incidental content database 22a and searches for desired incidental content.

The database manager 25 manages the incidental content database 22a. For example, when incidental content (incidental content play control file) is newly uploaded, the database manager 25 updates the incidental content database 22a by registering the uploaded incidental content in the incidental content database 22a. When incidental content (incidental content play control file) is deleted, the database manager 25 performs a deletion process and then updates the incidental content database 22a accordingly.

A generation managing unit 25a represents one of a variety of database management functions of the database manager 25.

The generation managing unit 25a manages the generations of the incidental content stored on the incidental content server 2. The concept of the generation of the content and a generation management process performed by the generation managing unit 25a, in accordance with one embodiment of the present invention, will be described later.

The encryptor 27 performs a predetermined encryption process on incidental content data to be transmitted from the incidental content server 2 to the user terminal 4. When the incidental content is uploaded, the user terminal 4 may have encrypted the incidental content data before transmission, depending on system operation. In such a case, the searcher 24 decrypts the incidental content data.

The network interface 29 communicates via the network 5. The network interface 29 under the control of the controller 21 receives the uploaded incidental content and the download request, and transmits the incidental content data (incidental content play control file) responsive to the download request.

Figure 8:
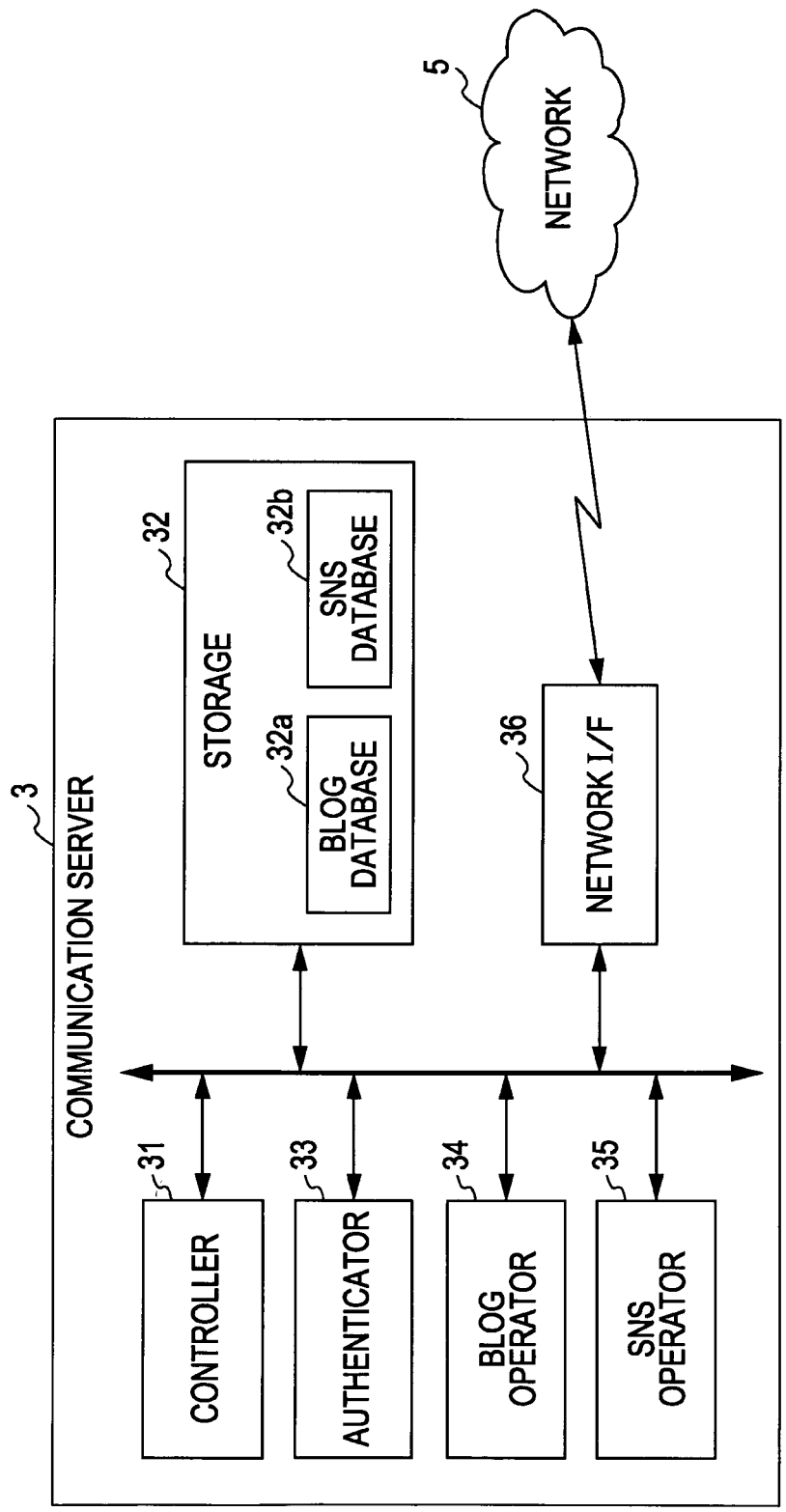
FIG. 8 illustrates an internal structure of a communication server in accordance with one embodiment of the present invention.

FIG. 8 illustrates an internal structure of the communication server 3. As shown in FIG. 8, the communication server 3 includes a controller 31, a storage 32, an authenticator 33, a blog operator 34, an SNS operator 35 and a network interface 36. The communication server 3 provides blog and SNS communication services.

The controller 31 generally controls each element in the communication server 3.

The storage 32, including an HDD, stores a blog database 32a and an SNS database 32b. The blog database 32a manages the data of blog, opened by the user, in the form of database. The SNS database 32b manages page content on a per SNS user basis in the form of database.

In response to a login request for blog updating and a login request for the SNS, the authenticator 33 uses a user ID or a password contained in the request, thereby performing an authentication process. If authentication results show that the user has been successfully authenticated, the login is allowed.

The blog operator 34 performs a variety of processes to allow blog to be operative. For example, in response to a blog access request and an authorized blog writing screen request, the blog operator 34 transmits data of blog screen and a blog writing screen. The blog operator 34 also manages the blog database 32a. For example, the blog operator 34 updates the blog database 32a, accounting for writing on the blog.

Similarly, the SNS operator 35 performs a variety of processes to allow SNS to be operative. For example, the SNS operator 35 transmits data of a page of SNS in response to the SNS page request and updates the SNS database 32b to account for writing on a diary.

The network interface 36 communicates via the network 5. The network interface 36 transmits page data in response to an access request to the blog or SNS.

The communication server 3 supports blog and SNS. Alternatively, different servers may be arranged respectively for blog and SNS. For example, GCM related service may be provided so that an individual user may issue information on a homepage operated by the individual user other than SNS and blog. Sites operated by individual users, such as homepages, are well known before SNS and blog become popular.

Figure 9:
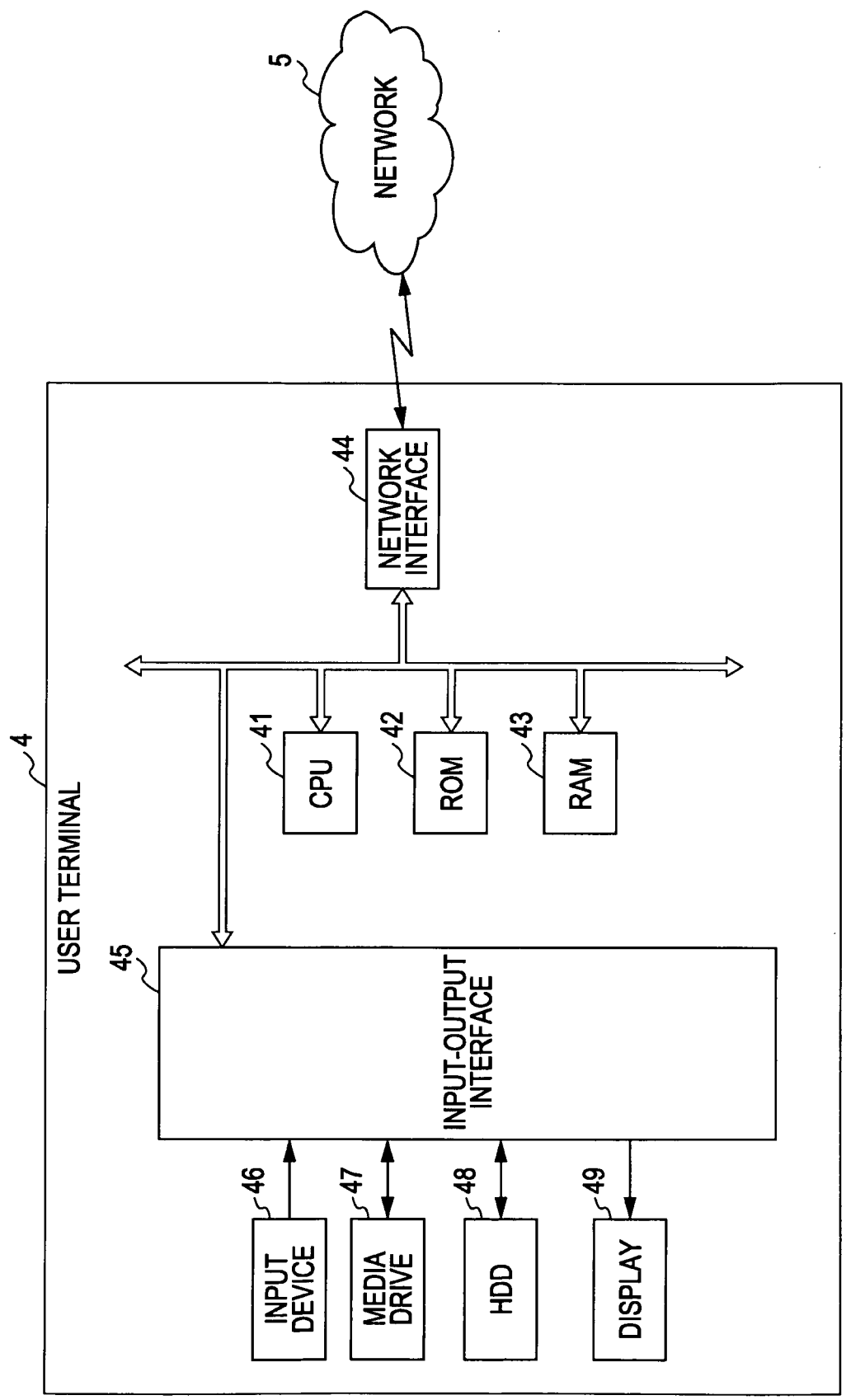
FIG. 9 illustrates an internal structure of a user terminal in accordance with one embodiment of the present invention.

FIG. 9 illustrates an internal structure of the user terminal 4. The hardware of the user terminal 4 is a personal computer.

The user terminal 4 includes a network interface 44 to communicate via the network 5. With the network interface 44, the user terminal 4 can communicate via the network 5 with each of the primary content server 1, the incidental content server 2, the communication server 3 and the user terminal 4 of another user.

A central processing unit (CPU) 41 executes a variety of processes in accordance with an operating system (OS) and a variety of programs installed on an HHD 48 and a program stored on a read-only memory (ROM) 42. In accordance with one embodiment of the present invention, an application program as the music editing and sharing application 100 is installed.

A random-access memory (RAM) 43, serving as a working area for the CPU 41, stores, as necessary, data and program required for the CPU 41 to perform the variety of programs.

An input-output interface 45 connects to an input device 46 including a keyboard and a mouse. The input-output interface 45 converts an operational signal output from the input device 46 into a signal to be supported by the CPU 41 and outputs the resulting signal to the CPU 41.

The input-output interface 45 also connects to a media drive 47. The media drive 47 records and plays data on a removable medium in a predetermined format.

The input device 46 connects to the HDD 48 including a hard disk as a recording medium. The CPU 41 reads and writes data and programs on the hard disk in the HDD 48 via the input-output interface 45.

The input-output interface 45 connects to a display 49 for displaying images thereon.

Figure 10:
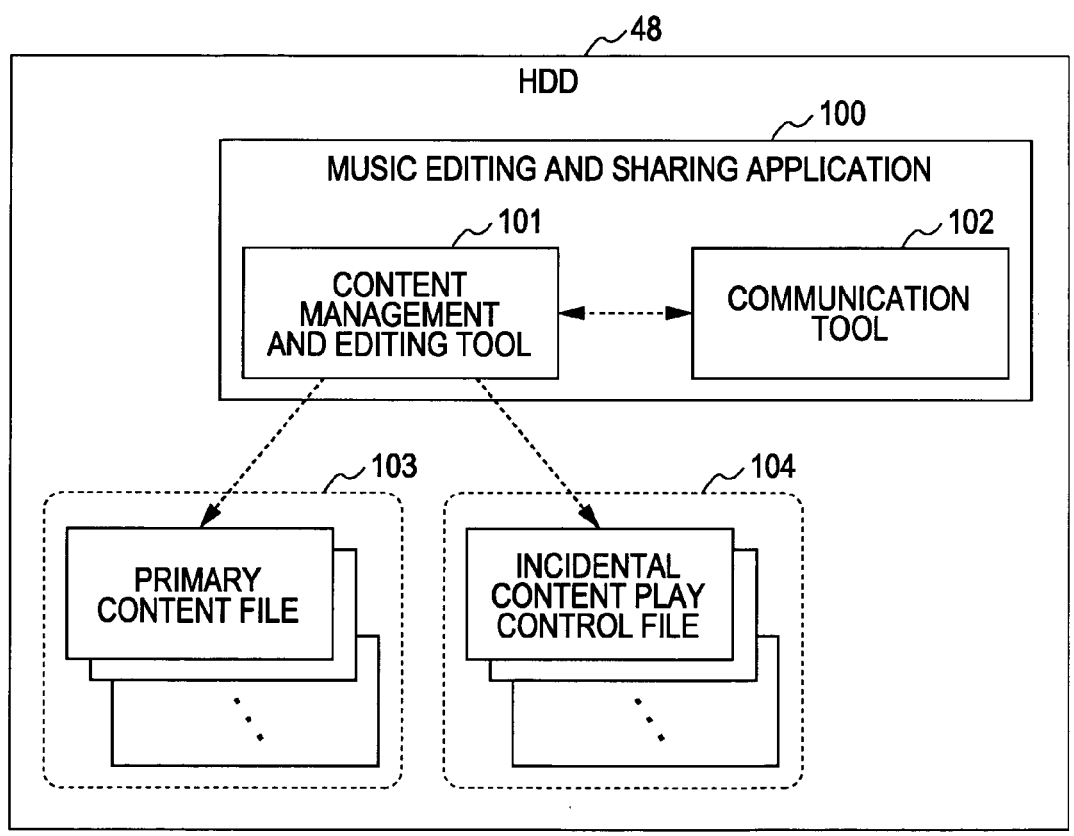
FIG. 10 illustrates information to be stored on a hard disk drive in the user terminal in accordance with one embodiment of the present invention.

FIG. 10 illustrates a structure of data stored on the HDD 48 in the music delivery and sharing system of one embodiment of the present invention.

As shown in FIG. 10, the HDD 48 stores the music editing and sharing application 100 as the data of application programs related to the music delivery and sharing system of the embodiment of the present invention. The music editing and sharing application 100 is stored onto the HDD 48 in an installation process. Under the control of the music editing and sharing application 100, the HDD 48 stores, as application files, at least one primary content file (primary content file group 103) and at least one incidental content play control file (incidental content play control file group 104).

The music editing and sharing application 100, if viewed in terms of function, is composed of a program part as the content management and editing tool 101 and a program part as the communication tool 102. The content management and editing tool 101 downloads the primary content file (composed of audio data and metadata) and the incidental content play control file and performs a file operation on the primary content file of the primary content file group 103 and the incidental content play control file of the incidental content play control file group 104. The content management and editing tool 101 also performs an editing process responsive to an editing operation input and a production process on the incidental content play control file responsive to editing results. The communication tool 102 accesses the communication server 3, thereby operating the blog and SNS.

Figure 11:
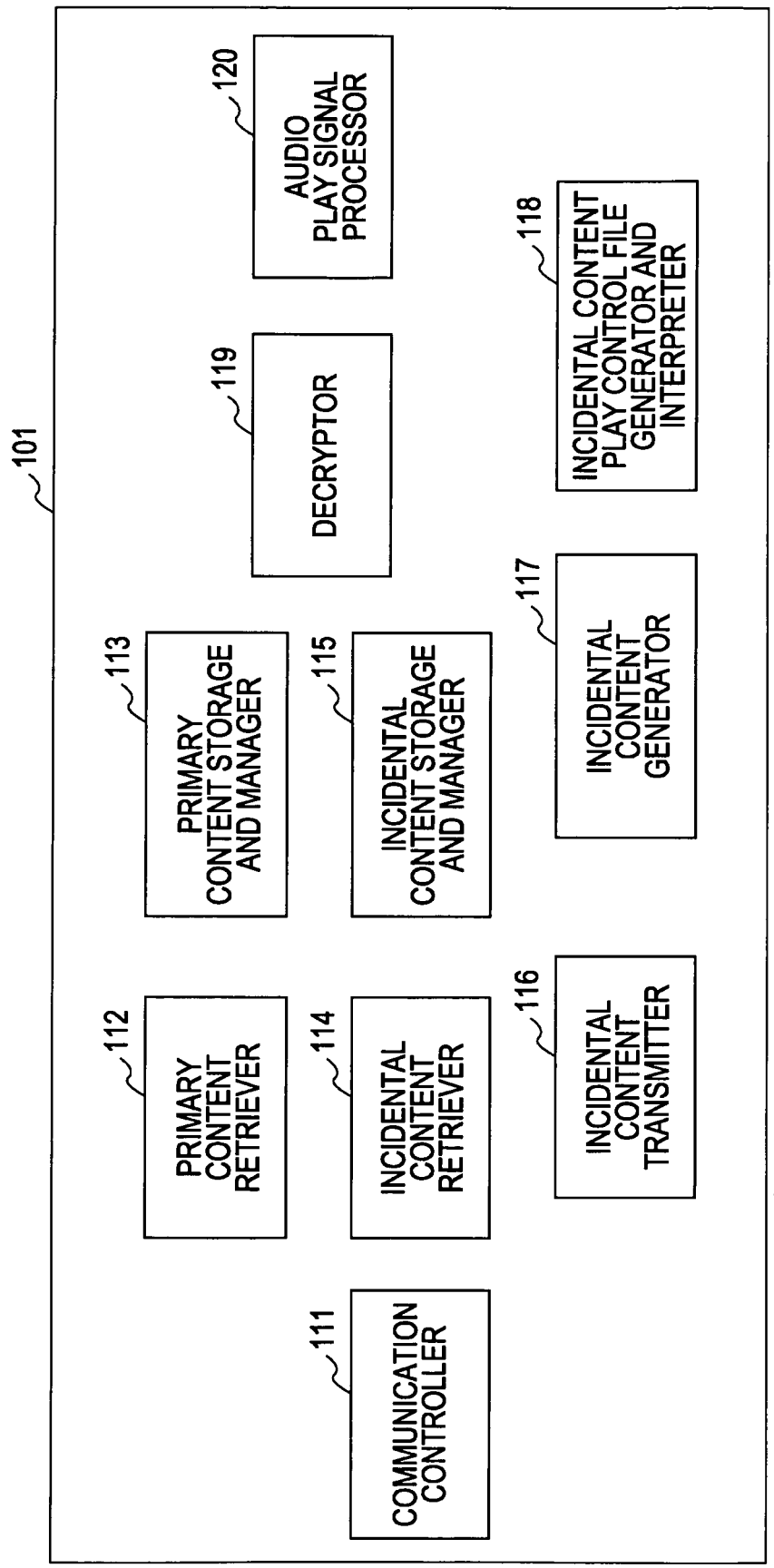
FIG. 11 is a functional block diagram of a program as a content editing and management tool of the music editing and sharing application in accordance with one embodiment of the present invention.

FIG. 11 is a functional block diagram diagrammatically illustrating a program structure of the content management and editing tool 101. As shown in FIG. 11, the content management and editing tool 101 includes a communication controller 111, a primary content retriever 112, a primary content storage and manager 113, an incidental content retriever 114, an incidental content storage and manager 115, an incidental content transmitter 116, an incidental content generator 117, a incidental content play control file generator and interpreter 118, a decryptor 119 and an audio play signal processor 120.

The communication controller 111 includes a program for communicating with one of the primary content server 1 and the communication server 3 in order to manage and edit content.

The primary content retriever 112 includes a program for retrieving primary content by downloading the primary content. The primary content retriever 112 provides a user interface for downloading the primary content. Furthermore, the primary content retriever 112 controls the communication controller 111 to issue a download request command and to receive a packet of data of the primary content. The primary content retriever 112 then restores the data in a data format as the primary content.

The primary content storage and manager 113 stores on the HDD 48 the primary content file retrieved by the primary content retriever 112 and manages the stored primary content file. For example, the primary content storage and manager 113 manages songs, for example, by sorting the songs according to artist name, album unit, genre, etc.

The incidental content retriever 114 includes a program for retrieving incidental content by downloading the incidental content.

The incidental content storage and manager 115 stores on the HDD 48 the incidental content play control file retrieved by the incidental content retriever 114 and manages the stored incidental content play control file.

The incidental content transmitter 116 under the control of the communication controller 111 causes the incidental content play control file to be transferred to the incidental content server 2 in an appropriate manner.

The incidental content generator 117 edits the editing material content of FIG. 3, i.e., produces the body of a song as incidental content. For example, the incidental content generator 117 provides a user interface for editing operation.

The incidental content play control file generator and interpreter 118 generates the incidental content play control file that accounts for the song of the incidental content generated by the incidental content generator 117. When the incidental content is played, the incidental content play control file generator and interpreter 118 interprets the incidental content play control file of FIG. 4 and determines a play sequence based on the editing material content.

In accordance with one embodiment of the present invention, the primary content file is encrypted before being transmitted by the primary content server 1. The incidental content play control file is also encrypted before being transmitted from the incidental content server 2 to the user terminal 4 in the download operation. The incidental content data, when uploaded from the user terminal 4 to the incidental content server 2, may also be encrypted. The decryptor 119 decrypts the encrypted primary content file and encrypted incidental content play control file when the primary content file and the incidental content play control file need to be played or edited. The incidental content play control file is encrypted if necessary.

The audio play signal processor 120 performs a predetermined signal process on the digital audio data before being converted into an analog signal when the digital audio data is played. For example, if the primary content file has been compression encoded, a decoding process needs to be performed on the digital audio signal in order to obtain a digital audio signal in pulse-code modulation (PCM), for example. When the incidental content is played, the audio play signal processor 120 plays a data portion of the primary content file as editing material content in accordance with the play process sequence determined by the incidental content play control file generator and interpreter 118.

When the incidental content is played, the incidental content play control file generator and interpreter 118 accounts for the interpretation results of the play control information in an editing work screen as a graphic user interface (GUI) provided by the incidental content generator 117. More specifically, a play instruction indicated by the play control information is displayed on the editing work screen in a manner recognizable by the user. Upon viewing the instruction, the user can learn how the incidental content has been produced. This means that the user can recognize accurate information as to how the creator has produced the incidental content. For example, the user may wish to know how an audio digital signal of a song as content has been produced. The user may have guessed before how the content has been produced, by simply listening to the song and getting the acoustic impression of the song. The user terminal 4 of one embodiment of the present invention allows the user to learn more in detail and specifically how the incidental content has been produced. With the incidental content shared among users, the users using the music delivery and sharing system of the embodiment of the present invention are expected to improve substantially technique and knowledge related to music production. The music delivery and sharing system provides a high degree of entertainment and usefulness to users who are interested in music production.

The structure of the incidental content play control file is described below with reference to FIG. 12.

Figure 12:
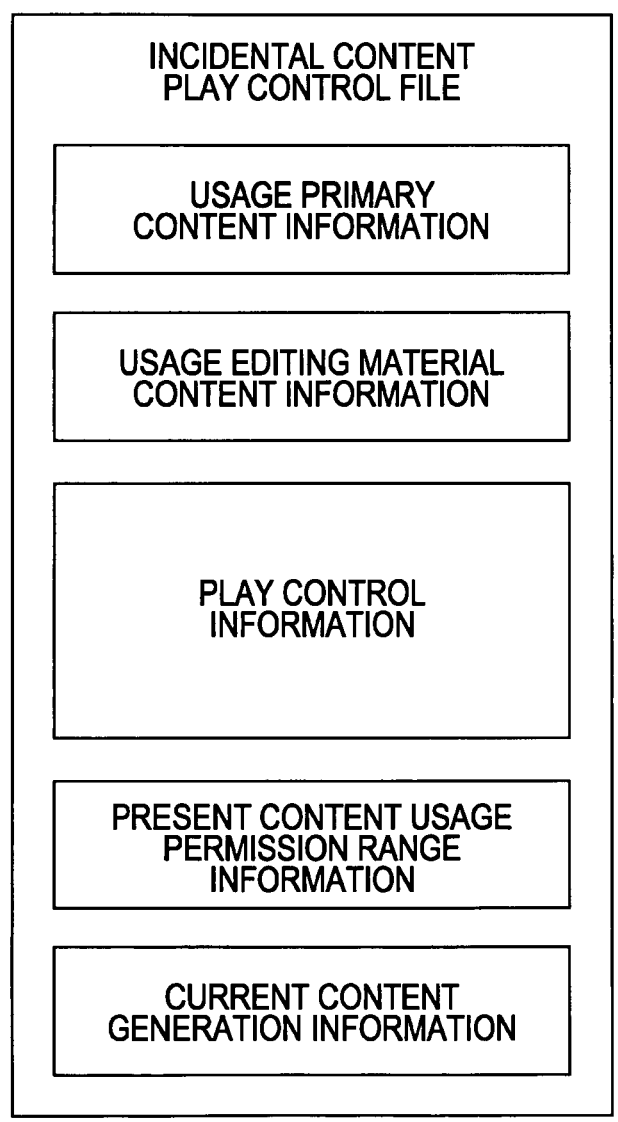
FIG. 12 diagrammatically illustrates a structure of an incidental content play control file in accordance with one embodiment of the present invention.

As shown in FIG. 12, the incidental content play control file contains, at least, usage primary content information, usage editing material content information, play control information, content usage permission range information and current content generation information. The incidental content play control file contains these pieces of information in a predetermined structure. The play control information is information body (main information) of the incidental content play control file. The other information (the usage primary content information, the usage editing material content information, the content usage permission range information and the current content generation information) forms metadata (additional information).

The usage primary content information indicates the primary content required to play the song as the incidental content corresponding to the incidental content play control file (usage primary content). In other words, the usage primary content information indicates the primary content used to produce present incidental content. As shown in FIG. 5A, information indicating the primary content forming the incidental content newly produced in the editing process is the usage primary content information. As shown in FIG. 5A, the primary content A and B is illustrated as the usage primary content information. As shown in FIG. 5B, the primary content A, B and C is illustrated as the usage primary content information. As shown in FIG. 5C, the primary content C, D, E and F is illustrated as the usage primary content information.

Primary content may be deleted from the editing material content that has been edited to produce the incidental content.

With reference to FIG. 5B, in the new incidental content as a song that has been obtained by editing the editing material contents A and B, the primary content A and C may be used as sound sources while the primary content D may not be used. In such a case, the audio data of the primary content used to play the incidental content is only the primary content A and C and the primary content D is not required.

In one display mode of the usage primary content information, only the primary content used to play the incidental content is displayed. More specifically, only the primary content A and C is displayed while the primary content D is not displayed.

In another display mode of the usage primary content information, all three pieces of the primary content A, C and D are displayed. Although the primary content D is actually not used, the incidental content is considerably affected in the course of production by the primary content D. The primary content D is thus considered to be actually used. All primary content, if used at least once by a generation in which present incidental content is produced, is contained in the usage primary content information.

The usage primary content information contains metadata related to the primary content listed therein.

The usage editing material content information indicates editing material content directly used to produce the incidental content corresponding to the present incidental content play control file (usage editing material content and direct usage content). The usage editing material content information of the edited incidental content shown in FIG. 5A is information indicating actual primary content files as the editing material content A and B. The usage editing material content information of the edited incidental content shown in FIG. 5B is information indicating incidental content (incidental content play control files) as a primary content file as the editing material content A and incidental content (incidental content play control file) as the editing material content C.

The usage editing material content information includes information related to each editing material content.

The play control information contains descriptions of a process sequence for playing a song as present incidental content. The play control information contains a description indicating primary content as real audio data to be played, a description indicating a data portion to be used to play incidental content from the audio data as the primary content and a description indicating time for playing the data portion. The play control information also contains descriptions for performing special effects, such as fade-in, fade-out, overlap, equalizing (sound quality adjustment), play speed magnification, reverberation, delay, etc.

The content usage permission range information indicates information regarding a usage permission range set in the current incidental content. The resent content usage permission range information has a structure of usage content information described with reference to FIG. 13.

FIG. 13 illustrates the structure of each of the usage primary content information and the usage editing material content information.

As shown in FIG. 13, the usage primary content information and the usage editing material content information are generally constructed by concatenating pieces of unit file information. Each unit file information corresponds to usage editing material content. For convenience of explanation, each of the usage primary content information and the usage editing material content information is simply referred to as "usage content" if there is no need to discriminate between the usage primary content information and the usage editing material content information.

The unit file information includes information items for file ID, artist name, song name, and content usage permission range information.

The file ID is a identifier unique to a content file of the usage content. More specifically, the file ID is the one for a primary content file of the usage content or the one for an incidental content play control file of the usage content. The primary content server 1 attaches the file ID to the usage primary content file and the incidental content server 2 attaches the file ID to the incidental content play control file.

The artist name as an information item indicates the name of a performer who has played the usage content or the name of a creator who has created the usage content.

The song name indicates the name of a song of the corresponding usage content.

The generation information is stored at the information item for generation. The generation information indicates the generation of the corresponding content. In the music delivery and sharing system of one embodiment of the present invention, the primary content is defined as a first generation. The incidental content is an N-th generation depending on the editing material content in accordance with a predetermined rule. If the usage content information of FIG. 12 is usage primary content information, information indicating the first generation is stored at the generation information. In the case of the editing material content information, stored information indicates a generation set for each usage content (primary content or incidental content) corresponding to the unit file information.

The usage permission range information is composed of usage items 1-*n*.

Usage items 1-*n* list predetermined usage data related to each editing (secondary usage) of usage content. A variety of usage data assigned to the usage items is contemplated. For example, the following data may be listed:

Data as to whether secondary use of the present content is permitted;

Data related to the use of another content as an editing material created by an artist different from the artist of the present content;

Data related to the use of another content as an editing material belonging to an album different from the album of the present content;

Data related to use of special effects;

Data related use of a particular plug-in module;

Editing material extracted from the entire song;

Permission content related to an audio data portion that is extracted from the entire song as an editing material;

Number of generations (for example, if the use of a primary content is permitted down to a grandchild's generation, incidental content of a child using the primary content and incidental content of a grandchild using the primary content can be produced, but the incidental content of the grandchild cannot be edited using the corresponding usage content); and Data related to the number of and type of pieces of content permitted to be used in a secondary usage mode in combination with the present content.

Information related to the usage permission such as "permitted/unpermitted" is set at each usage item. The permission content described at the usage items is summed up so that the usage permission range of the corresponding usage content is displayed.

FIG. 14 illustrates the play control information of the incidental content play control file.

As shown in FIG. 14, a description delimited by brackets (symbols "[" and "]") indicates a single play control description of one piece of usage content.

The play control description of the usage control unit of FIG. 14 is described below.

The play control description of the usage content unit appearing at the head of the data of FIG. 14 is:

```
[
file_id=AAAAAA;
time=00:00-00:10;
position=vv-zz
]
```

This description means that the usage content is specified by a file ID=AAAAAA. Play time of the present incidental content using the usage content is 00:00 (starting point) to 00:10 (play time of 10 seconds). During the play time, a data segment of the usage content ranges from address vv to address zz.

The play control description of the subsequent usage content is:

```
[
file_id=AAAAAA;
time=00:10-00:15;
position=ss-tt
]
```

This description means that the usage content is specified by a file ID=AAAAAA. Play time of the present incidental content using the usage content is 00:10 to 00:15. During the play time, a data segment of the usage content ranges from address ss to address tt.

The play control description of the subsequent usage content is:

```
[
file_id=BBBBBB;
time=00:15-00:20;
position=pp-uu
]
```

This description means that the usage content is specified by a file ID=BBBBBB. Play time of the present incidental content using the usage content is 00:15 to 00:20. During the play time, a data segment of the usage content ranges from address pp to address uu.

In this way, the audio play signal processor 120 in the music editing and sharing application 100 interprets successively the play control descriptions delimited by the brackets ([and]), and performs play control process in response to interpretation results. The incidental content is thus output as an audio signal.

The structure of the primary content file is described below.

Figure 15:
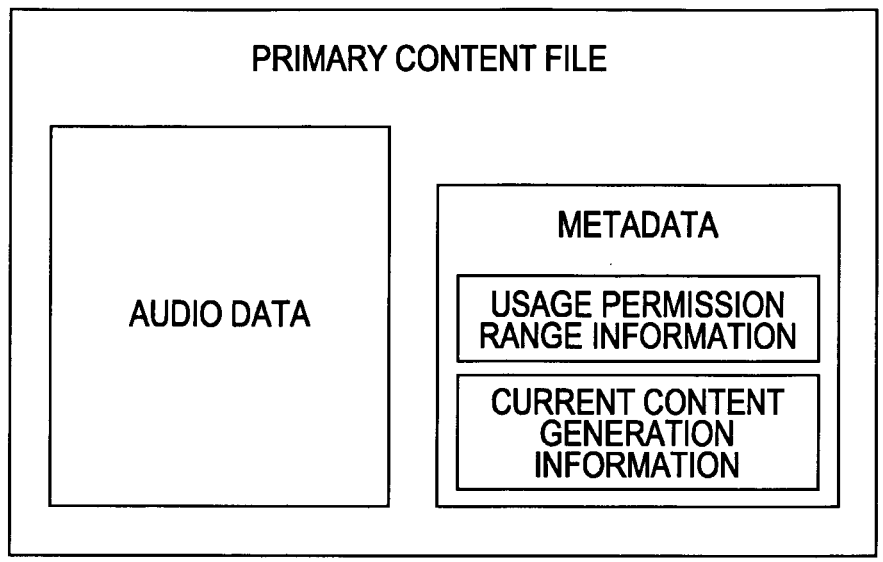
FIG. 15 diagrammatically illustrates a structure of a primary content file in accordance with one embodiment of the present invention.

As shown in FIG. 15, the primary content file includes the audio data in the predetermined format having a song as primary content and a variety of pieces of metadata related to the primary content. Compression encoded audio data is acceptable. By compression encoding the audio data, data size is reduced. The compression encoded audio data saves the memory capacity for the primary content in the primary content server 1 and is advantageous in transmission over the network.

The metadata forming the metadata group includes the usage permission range information and the current content generation information in addition to information, incidental to the audio data, including the song title, artist, title of the album to which the primary content belongs, genre, data format and data size.

The usage permission range information has the same meaning as the one in the unit file information of FIG. 13.

An incidental use of the primary content of one embodiment of the present invention is based on a permission of a copyright holder. The usage permission needs to be agreed with the copyright holder of the primary content (such as the artist). The range and content permitted by the copyright holder naturally vary depending on how copyright holder thinks of music. To respect the thinking of the copyright holder, the information setting the usage permission range of the primary content is also contained in the metadata. In this way, the interests of the copyright holder are respected. It is an idea that a uniform usage permission range is applied to the primary content. In accordance with one embodiment of the present invention, usage permission range may be set to be different from primary content to primary content to account for the interests of the copyright holder. The music delivery and sharing system can thus be more smoothly operated.

The usage items of the information relating to the present content usage permission range in the metadata of the primary content is not limited to that of the incidental content of FIG. 13. It is sufficient if usage items required for the primary content are set.

The current content generation information in the same primary content indicates the generation of the content produced in the music delivery and sharing system of one embodiment of the present invention. As previously discussed, the primary content is defined as a first generation. The current content generation information in the primary content contains information indicating the first generation.

Since the primary content is defined as the first generation, the current content generation information may be eliminated from the primary content file.

If incidental content is newly produced, the generation of the incidental content needs to be determined. In the case of an algorithm using the current content generation information contained in the editing material content as the metadata, the current content generation information is preferably contained in the primary content file. In this way, the generation of the new incidental content is determined based on the same algorithm by referencing the current content generation information without differentiating between the primary content and the incidental content.

Figure 16:
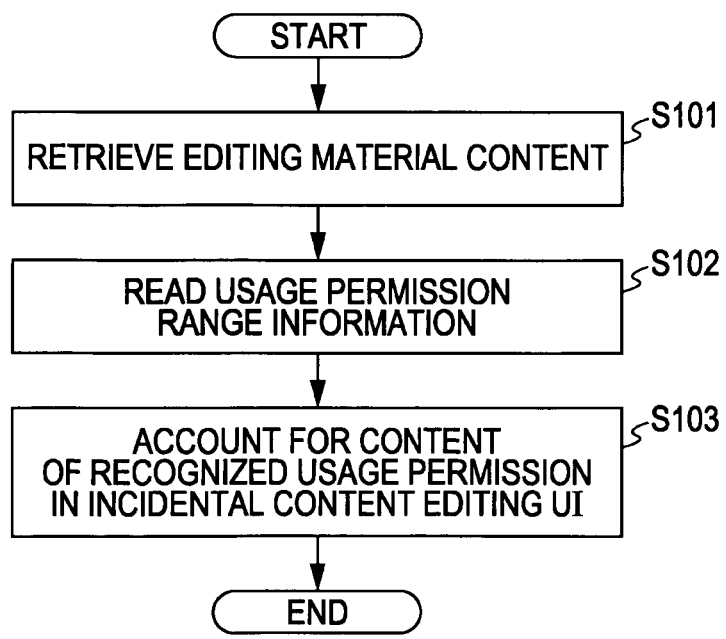
FIG. 16 is a flowchart of a process in which usage permission range setting of editing material content is accounted for in user interface (UI) in an incidental content editing process of the music editing and sharing application in accordance with one embodiment of the present invention.
Figure 17:
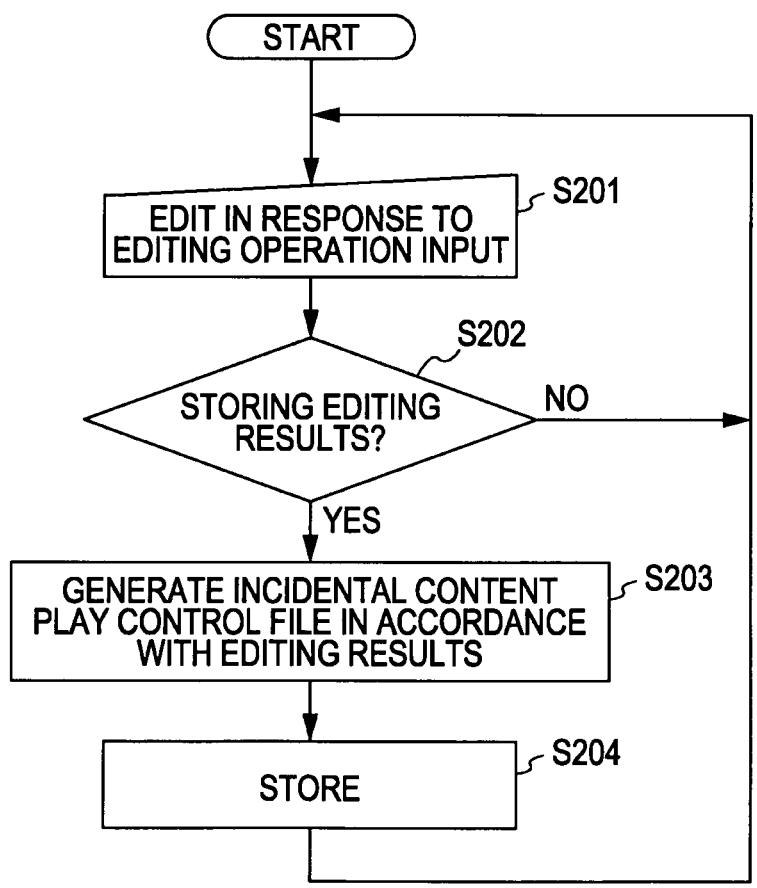
FIG. 17 is a flowchart illustrating production of the incidental content play control file in the incidental content editing process of the music editing and sharing application in accordance with one embodiment of the present invention.

The editing processes of the incidental content is described below with reference to flowcharts of FIGS. 16 and 17. The processes of FIGS. 16 and 17 are performed when the content management and editing tool 101 in the music editing and sharing application 100 is executed as a program.

The user of the user terminal 4 starts the content management and editing tool 101 in the music editing and sharing application 100 in order to edit the incidental content. The user searches the content to be used as a material for the production of the incidental content and registers (enters) the hit content as an editing material content. In response, the incidental content generator 117 in the content management and editing tool 101 performs the process of FIG. 16.

In step S101, the content management and editing tool 101 retrieves the data of the content registered as the editing material content. If the registered editing material content is the primary content, the data of a file as the primary content is retrieved. If the registered editing material content is the incidental content, the data of the incidental content play control file is retrieved.

In step S102, the content management and editing tool 101 reads the usage permission range information from the data retrieved in step S101. A variety of usage permissions set in the content registered as the editing material content is thus recognized as usage items 1-$n$ in the usage permission range information. In step S103, the content management and editing tool 101 sets the usage permission recognized in step S102 in a user interface (UI) for editing the incidental content. The process in step S103 disables the editing process beyond the usage permission range set in the editing material content. The incidental content generator 117 thus generates the incidental content.

FIG. 17 illustrates a generation process of the incidental content play control file as real data of the incidental content. The generation process is also performed when the content management and editing tool 101 is executed as a program.

In step S201, an editing process is performed in response to an editing operation input. For example, the incidental content generator 117 provides a graphic user interface (GUI) on which the user performs the editing process to produce the incidental content. Using the GUI, the user performs the editing operation to produce the incidental content. In response, the editing process is performed in step S201.

If it is determined in step S202 that an operation to store editing results has been performed, processing proceeds to step S203. In step S203, the incidental content play control file is produced based on the song as the incidental content obtained from the editing results. In step S204, the incidental content play control file is stored in an appropriate directory on the HDD 48. Subsequent to step S204, processing returns to step S201.

If the GUI screen is closed to produce the incidental content, the user may resume another process quitting the process of FIG. 17 (although such step is not shown).

The content usage permission range information is produced before the production of the incidental content play control file. The content usage permission range information may be automatically set on a per usage item basis in accordance with a predetermined rule within a range not beyond a minimum limit determined by summing content usage permission range information of each primary content as the original editing material. Alternatively, the content usage permission range information may be set in response to the user's setting. Even when the content usage permission range information is set by the user, the setting falls within a range not beyond a minimum limit determined by summing content usage permission range information of each primary content as the original editing material.

Figure 18:
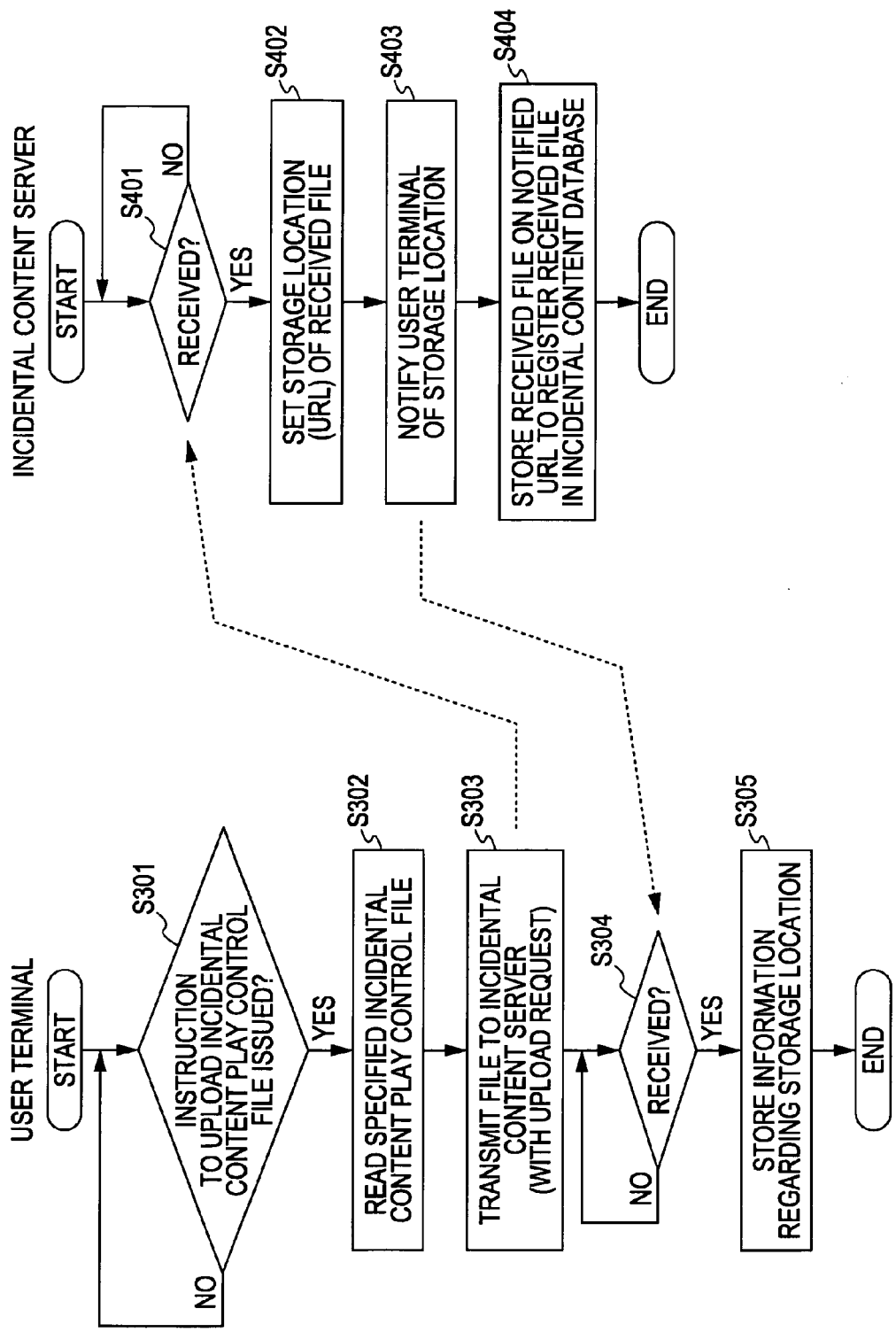
FIG. 18 is a flowchart illustrating an upload process of the incidental content performed by the user terminal and a corresponding process of the incidental content server in accordance with one embodiment of the present invention.

An upload process of the incidental content of the user terminal 4 is described below with reference to a flowchart of FIG. 18. A process performed by the incidental content server 2 in response to the upload process is also described with reference to the flowchart of FIG. 18. The process of the user terminal 4 is performed when the incidental content storage and manager 115 and the incidental content transmitter 116 are executed as programs. The process of the incidental content server 2 is performed in cooperation with the elements of FIG. 7. In practice, the process of the incidental content server 2 is performed when a computer system (CPU) forming the incidental content server 2 executes the program thereof.

In step S301, the user terminal 4 waits on standby for a command to upload the incidental content play control file. Pieces of incidental content (incidental content play control files) produced by the music editing and sharing application 100 are stored on the HDD 48. For example, the user operates the GUI provided by the content management and editing tool 101 to select at least one piece of incidental content to be uploaded, from among the incidental content and to upload at least one piece of incidental content. In response, the user terminal 4 generates a command instructing the upload of the incidental content corresponding to the incidental content selected on the GUI.

In step S302, the incidental content to be uploaded, namely, the incidental content play control file is read from a predetermined directory. In step S303, the user terminal 4 transmits the read incidental content play control file to the incidental content server 2 together with the upload request.

In step S401, the incidental content server 2 waits on standby for the upload request. In response to the receipt of the upload request, the incidental content server 2 performs step S402 and subsequent steps. To proceed to step S402 subsequent to the receipt of the upload request, an authentication process to authenticate the user is performed. Such an authentication process is omitted herein.

In step S402, the incidental content server 2 sets the storage location (URL) of the incidental content play control file received together with the upload request.

In step S403, the incidental content server 2 notifies the user terminal 4 having issued the upload request of the storage location of the uploaded incidental content (incidental content play control file).

The user terminal 4 having issued the upload request in step S303 waits on standby for the information relating to the storage location in step S304. Upon receiving the information regarding the storage location, the user terminal 4 stores the information regarding the storage location (URL) in an appropriate directory in step S305. The user can hereinafter call the information regarding the storage location by operating the content management and editing tool 101. If the storage location is a URL, a character string of URL may be displayed in response to a call request.

Figure 19:
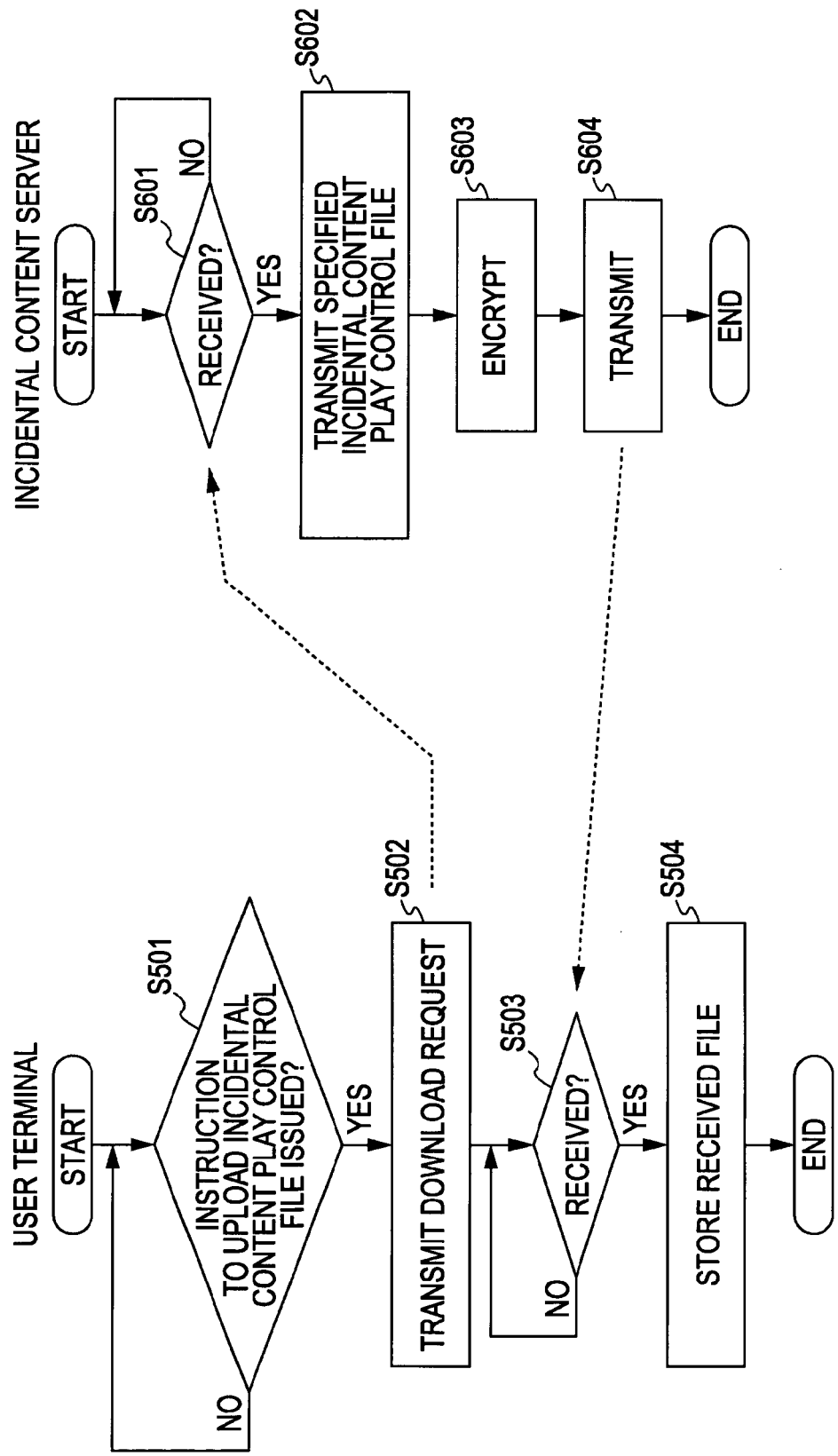
FIG. 19 is a flowchart illustrating a download process of the incidental content performed by the user terminal and a corresponding process of the incidental content server in accordance with one embodiment of the present invention.

FIG. 19 is a flowchart illustrating a download process of the incidental content performed by the user terminal 4 and a process performed by the incidental content server 2 in response to the download process. The process of the user terminal 4 is also performed when the incidental content storage and manager 115 and the incidental content transmitter 116 are executed as programs.

In step S501, the user terminal 4 waits on standby for a command instructing a download of the incidental content play control file. For example, the user operates the GUI provided by the content management and editing tool 101. The user thus accesses the incidental content server 2, selects at least one piece of incidental content to be downloaded, with a list of stored and managed incidental content displayed, and operates the GUI to download the selected incidental content. If an affirmative answer to the determination in step S501 results, processing proceeds to step S502.

In step S502, the user terminal 4 transmits a download request to the incidental content server 2 in response to the download command. The download request contains information specifying a directory (storage location) of the incidental content selected during the download command entering operation. The download request may be issued using a file ID of the incidental content play control file as real data of the incidental content rather than using the storage location.

In step S601, the incidental content server 2 waits on standby for the receipt of the download request. Upon the receipt of the download request, the incidental content server 2 performs the process in step S602. Before proceeding to step S602 subsequent to the receipt of the download request, an authentication process is performed. The authentication process is not discussed herein.

In step S602, the incidental content database 22a of the storage 22 is accessed to search the specified incidental content (incidental content play control file). The hit incidental content play control file is then transmitted to the requesting user terminal 4.

The user terminal 4 having transmitted the download request in step S502 waits on standby for the receipt of an incidental content play control file in response to the download request in step S503. Upon receipt of the incidental content play control file, the user terminal 4 stores and manages the received incidental content play control file in step S504.

Figure 20:
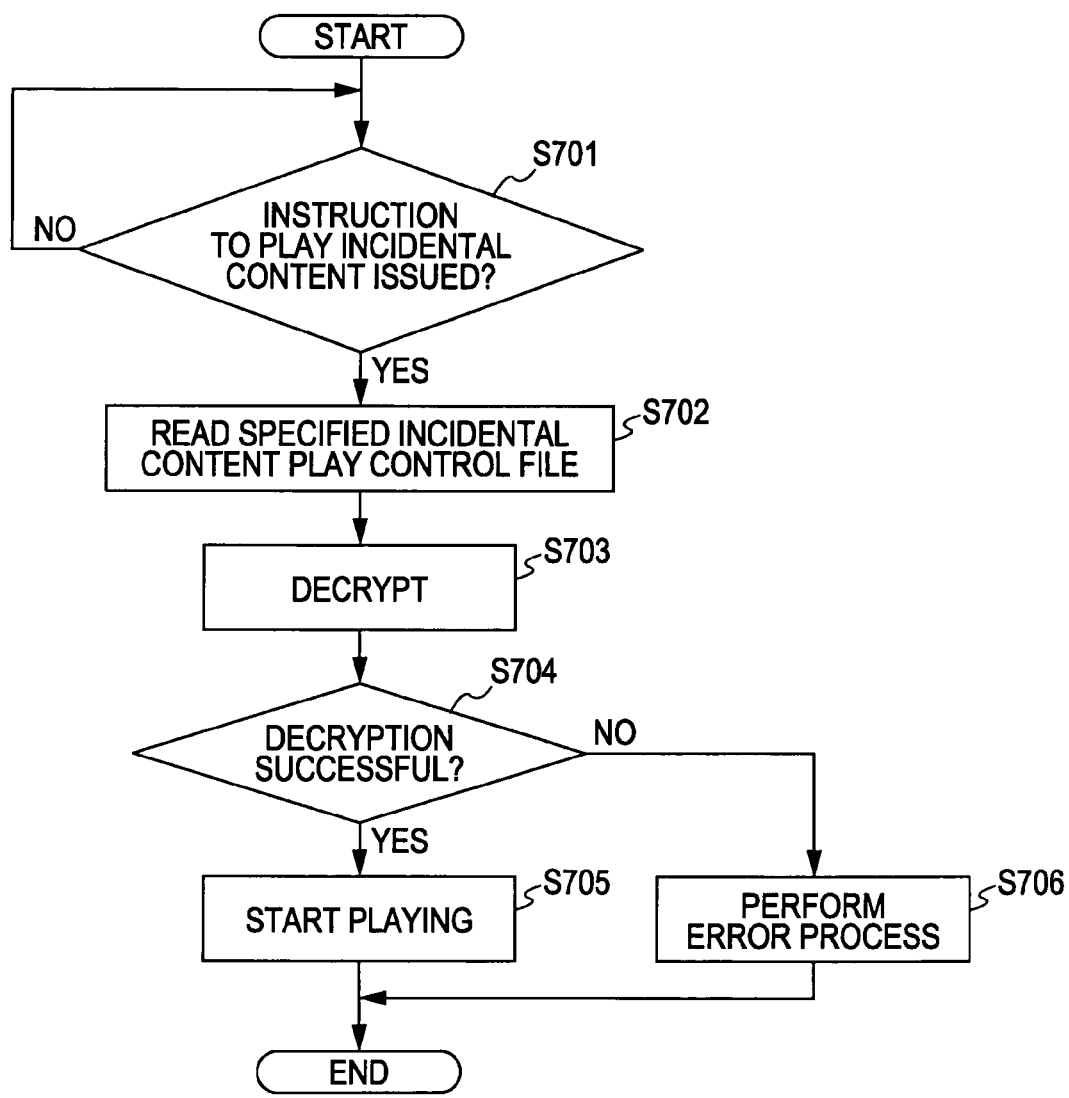
FIG. 20 is a flowchart illustrating a play process of the incidental content performed by the user terminal in accordance with one embodiment of the present invention.

FIG. 20 is a flowchart illustrating a playing process of the incidental content acquired in the download process (stored on the HDD 48). The process of the user terminal 4 is performed when the incidental content storage and manager 115, the decryptor 119 and the audio play signal processor 120 are executed as programs.

In step S701, the user terminal 4 waits on standby for a play start command to play the incidental content downloaded and stored on the HDD 48. The user now operates the GUI provided by the incidental content storage and manager 115, selects one piece of incidental content from the incidental content stored on the HDD 48 and gives an instruction to start playing the selected incidental content. Processing proceeds from step S701 to step S702.

In step S702, the incidental content play control file corresponding to the selected incidental content is read from the HDD 48.

It is assumed that the incidental content data acquired through downloading is stored in the encrypted state thereof on the HDD 48. In step S703, the read incidental content is decrypted.

If it is determined in step S704 whether the encryption process performed in step S703 has been successfully completed.

If the incidental content that is specified to be started in step S701 is the one legally downloaded from the incidental content server 2, the decryption process in step S703 is successfully completed and appropriate incidental content data is restored.

If the incidental content data is the one that is retrieved from the incidental content server 2 using means other than the downloading, the incidental content may or may not be encrypted using a different algorithm. In such a case, correct incidental content data cannot be restored through the decryption process in step S703 or no decryption process is required at all. More specifically, the decryption process in step S703 is aborted. The decryption process is also aborted in step S703 if no decryption process is required at all.

If it is determined in step S704 that an affirmative answer is obtained with successful decryption results, processing proceeds to step S705. The play control process of this incidental content then starts. If it is determined in step S704 that a non-affirmative answer is obtained with aborted decryption results, processing proceeds to step S706. An error process is thus executed. In the error process, the play control process is not started for the incidental content specified this time and the GUI thus notifies the user that the incidental content specified this time is unauthorized and cannot be played.

In accordance with one embodiment of the present invention, the user terminal 4 can play only the incidental content that has been retrieved from the incidental content server 2 in an authorized download process. The copyrights of the primary content and the incidental content are thus protected.

Another mechanism may be considered to allow only the incidental content downloaded from the incidental content server 2 in an authorized manner to be played. For example, when the user terminal 4 receives the incidental content in an authorized manner, the incidental content is decrypted. The incidental content with decryption results attached thereto is stored on the HDD 48. During playing, the attached information is referenced to determine whether to play or not. When the incidental content server 2 transmits the incidental content, a special code indicating that the incidental content is to be downloaded is embedded in the incidental content by the incidental content server 2. During playing, the user terminal 4 verifies the presence or absence of the code and the incidental content to determine whether to play the incidental content.

The music delivery and sharing system of one embodiment of the present invention provides the basic usage mode of FIG. 2. The music delivery and sharing system further positively manages generations of incidental content. The management of generation will further described below.

Figure 21:
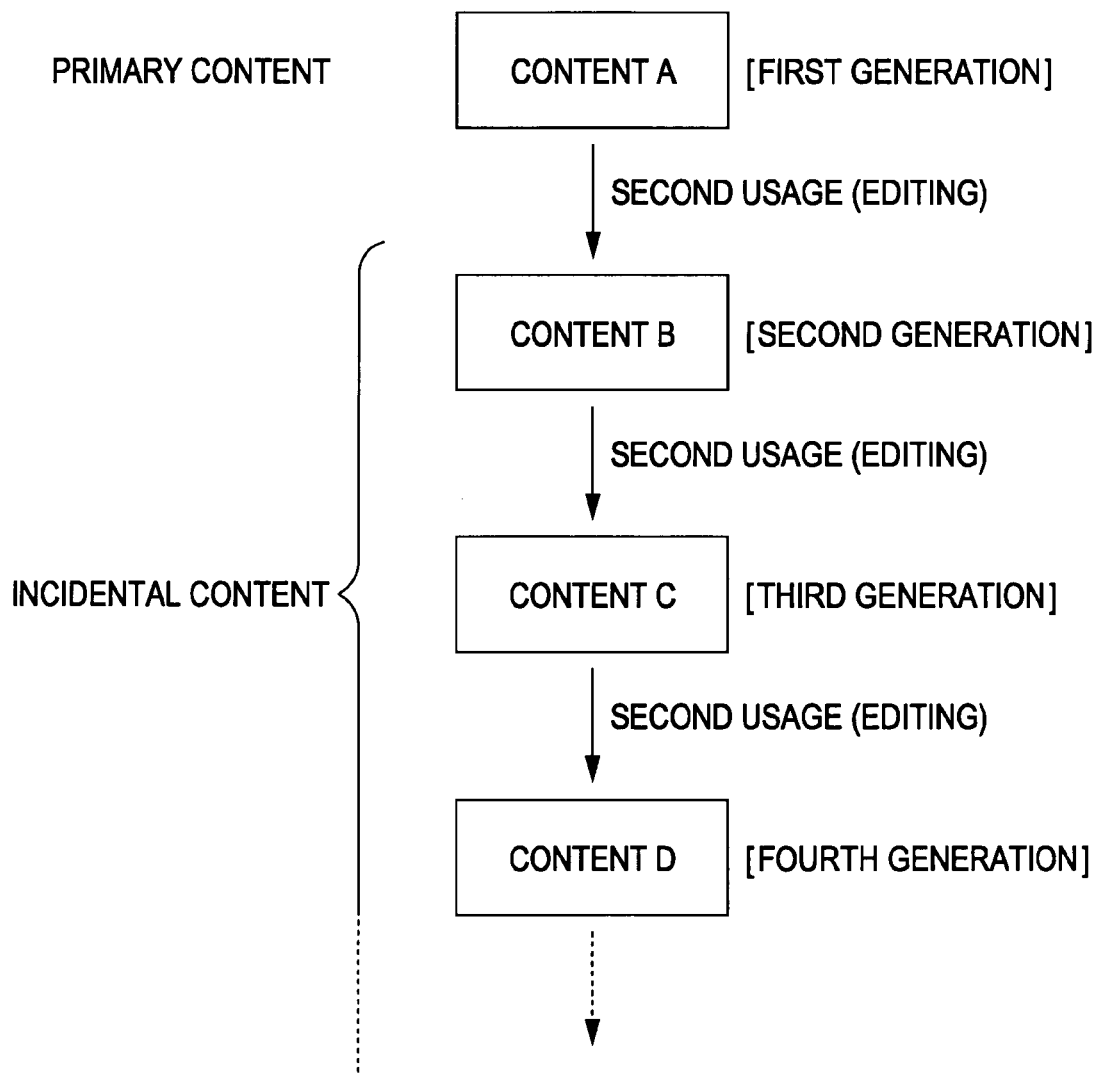
FIG. 21 illustrates the definition generation of content in the music delivery and sharing system in accordance with one embodiment of the present invention.

FIG. 21 diagrammatically illustrates the basic concept of the generation of content in the music delivery and sharing system.

Content A is shown as primary content in FIG. 21. In accordance with one embodiment of the present invention, the primary content is not the one that has been secondarily processed from the editing material content but the original one in the music delivery and sharing system. The primary content is thus defined as first generation content. The content A as the primary content is the first generation content.

Content B as new incidental content is now produced by editing the content A as a direct editing material in a secondary usage mode. The relationship between the new incidental content and the editing material content that has been directly used in a secondary usage mode to produce the new incidental content is viewed as a parent-child relation. The incidental content as the content B is thus obtained using the first generation primary content in a secondary usage mode and thus a next generation, i.e., a second generation.

Based on the same logic, content C as incidental content is produced using the content B as an editing material content in a secondary usage mode. The content C is thus third generation. Content D is produced using the content C as a direct editing material content in a secondary usage mode. The content D is thus a fourth generation. Hereinafter, each time incidental content is produced in a secondary usage mode, variable N is incremented where N represents an N-th generation.

Figure 22:
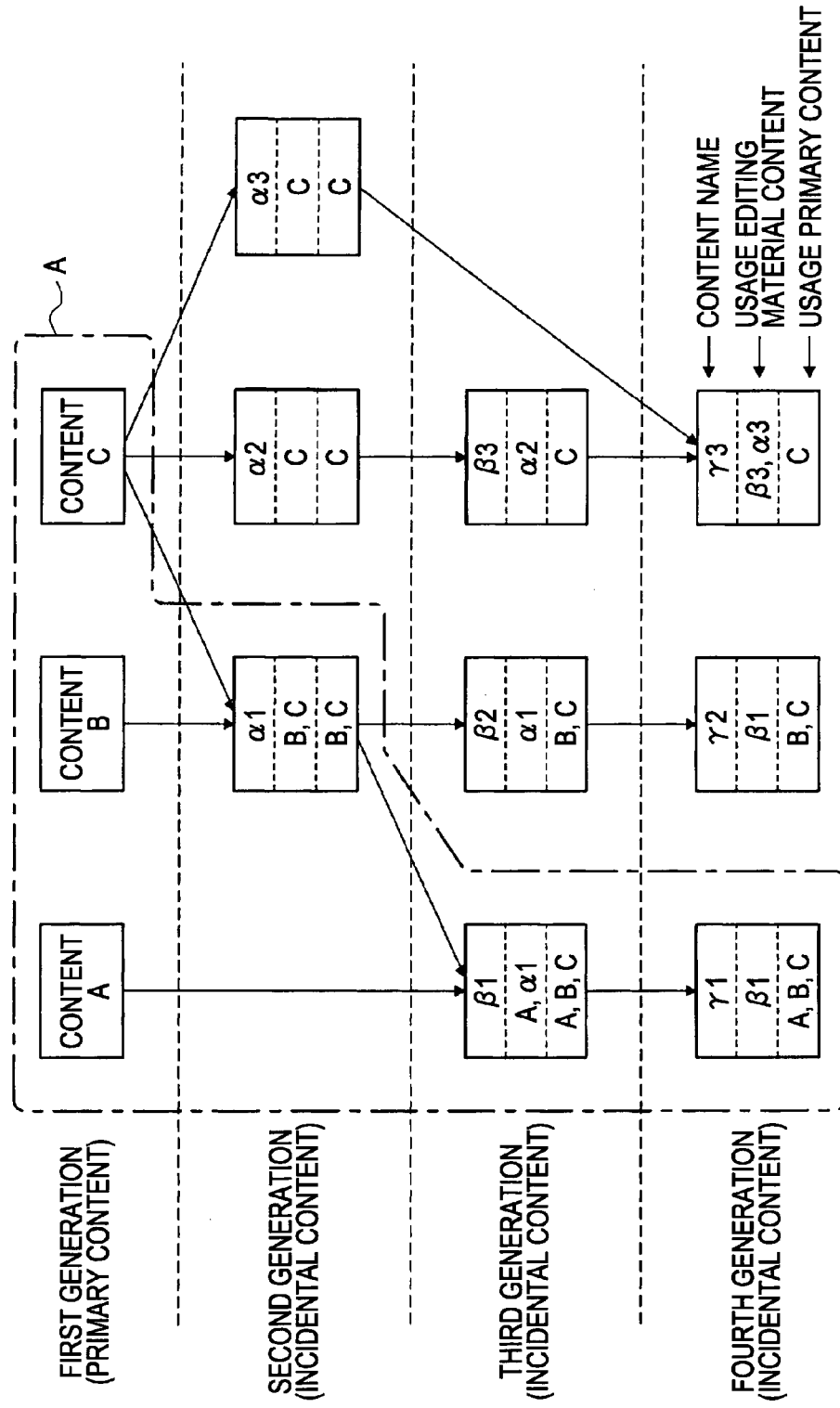
FIG. 22 illustrates an example of rule of generation of incidental content in the music delivery and sharing system in accordance with one embodiment of the present invention.

In practice, the incidental content is often produced using two or more pieces of editing material content in a secondary usage mode. FIG. 22 illustrates a rule that applies generation setting of the new incidental content. As shown in FIG. 22, each incidental content at the second and subsequent generations contains three pieces of information content. More specifically, content names are shown at the top layer, usage editing material content based on the usage editing material content information is shown at intermediate layer and usage editing material content based on the usage primary content information is shown at the bottom layer.

As shown in FIG. 22, three pieces of content, namely, content A, content B and content C, are shown in the first generation content (i.e., primary content). Content $\alpha 1$ is shown as incidental content that has been produced using content B and C in a secondary usage mode. The content $\alpha 1$ is produced using the content B and C as editing material content (parent content). The content $\alpha 1$ is second generation content in succession to the first generation content. The current content generation information in the incidental content play control file as the content α1 contains information indicating the second generation.

To produce the content α1, the music editing and sharing application 100 produces the usage editing material content information to indicate that the editing material content is the content B and C and generates the usage primary content information to indicate that the primary content (usage primary content) as the original editing material is the content B and C.

Content α2 is incidental content that has been produced by using only the content C as an editing material in a secondary usage mode. Since the content C is first generation content, the content α2 is a second generation. Similarly, content α3 is incidental content that has been produced using only the content C as an editing material and is thus a second generation.

The usage editing material content information is generated to indicate that the content α2 and α3 contains only the content C as the editing material content and the usage primary content information is generated to indicate that the usage primary content contains only the content C.

Content β1 is incidental content that has been produced using the content A and the content α1 as editing materials in a secondary usage mode. The content A is the first generation while the content α1 is the second generation. In comparison, the content α1 is a later generation. The content β1 is thus set to be a third generation in succession to the content α1.

In accordance with one embodiment of the present invention, incidental content that has been produced using a plurality of pieces of editing material content different in generation is set to be at a generation subsequent to the latest generation of the editing material content.

The usage editing material content information of the content β1 is generated to indicate that the editing material content contains the content A and α1. Since the usage primary content of the content α1 contains the content B and C, the content β1 is recognized as containing as the primary content of the original editing material the content A and the content B and C. The usage primary content information is generated to indicate that the usage primary content is three pieces of content, namely, content A, B and C.

The content β2 is incidental content that has been produced using only the content α1 as the editing material content at the second generation in a secondary usage mode. The content β2 is a third generation.

Content β3 is incidental content data that has been produced by using only the content α2 as the second generation as the editing material content. The content β3 is thus a third generation.

The usage editing material content information of the content β2 is generated to indicate that the editing material content is only the content α1. The usage primary content information is generated to indicate that the usage primary content information is the content B and C.

The usage editing material content information of the content β3 is generated to indicate that the editing material content is only the content α2. The usage primary content information is generated, thereby taking over the content α2. The usage primary content is only the content C.

Content γ1 is incidental content that has been produced by using only the content β1 at the third generation as the editing material content. The content γ1 is thus a fourth generation. The usage editing material content information of the content γ1 is generated to indicate that the editing material content is only the content β1, and the usage primary content information is generated, taking over the content β1. The usage editing material content is thus the content A, B and C.

Content γ2 is incidental content that has been produced by using only the content β2 at the third generation as the editing material content. The content γ2 is thus a fourth generation. The usage editing material content information of the content γ2 is generated to indicate that the editing material content is only the content β2, and the usage primary content information is generated, taking over the content β2. The usage editing material content is thus the content B and C.

Content γ3 is incidental content that has been produced by using only the content β3 at the third generation and the content α3 at the second generation as the editing material content in a secondary usage mode. In accordance with the rule of the generation determination, the content γ3 is determined to be a fourth generation subsequent to the latest generation of the editing material content, namely, the third generation.

The usage editing material content information of the content γ3 is generated to indicate the usage editing material content is the content β3 and α3. The usage primary content information is generated to indicate the usage primary content is only the content C. Although the editing results of the content β3 and the content α3 are different from each other, the original editing material thereof is only the content C.

The content γ1 at the fourth generation of FIG. 22 is now discussed.

For example, the information regarding the parent content (editing material content) directly used to produce the incidental content play control file is described in the editing material content information. In accordance with the editing material content information, the editing material content of the content γ1 is only the content β1.

If the editing material content information of the content β1 is referenced, the editing material content used to produce the content β1 is the content A and the content α1.

The content A out of the content A and the content α1, as the editing material content, is the primary content and is thus back-tracked to the first generation. If the usage editing material content information of the content α1 as the incidental content is referenced, the content α1 is produced using the content B and C in a secondary usage mode as the editing material content.

Each of the content B and the content C can date back to the first generation.

A generation tree of the usage content down to the appearance of the content 71 is back-tracked for searching starting with the content γ1. The generation tree within a generation range A is surrounded by a dot-and-dash chain line as shown in FIG. 22. The editing material content and the incidental content obtained by using the editing material content in a secondary usage mode are viewed by analogy with a parent-child relation. As shown in FIG. 22, the parent-child relation of the content preceding the content γ1 is thus clearly recognized.

In accordance with one embodiment of the present invention, the information indicating the editing material content (usage editing material content information) is associated with the incidental content. Based on the information, the generation tree down given incidental content is back-tracked through generations (generation recognition).

The music delivery and sharing system of one embodiment of the present invention performs the generation searching and recognition. With the generation searching and recognition function, the music delivery and sharing system becomes more useful.

For example, with a single piece of incidental content, the primary content that has been directly used in a secondary usage mode to produce the incidental content, the incidental content (editing material content) and the primary content (original editing material content) heretofore used to produce the incidental content are known from the usage editing material content information and the usage primary content information. Through the generation recognition process, information relating the generation tree of the incidental content (generation structure) is known.

For example, the music delivery and sharing system of one embodiment of the present invention inquires the incidental content server 2 of the generation structure of the incidental content specified by the user terminal 4. The music delivery and sharing system then displays information regarding the generation structure returned from the incidental content server 2 onto a user interface of the music editing and sharing application 100. The user of the user terminal 4 can thus easily learn the reason why content of interest thereto is constructed in generations.

In one model, a fee may be charged on the secondary usage of the content and a creator and a producer of the used content must be rewarded accordingly. When such a model is applied to the music delivery and sharing system, the generation recognition process becomes effective in the model. More specifically, in a payment process, a predetermined reward sharing rule is applied to the generation structure recognized through the generation recognition process. Regardless of the complexity of the generation structure, the reward is automatically set for each content.

FIG. 23 is a flowchart a generation recognition process performed between the user terminal 4 and the incidental content server 2. In the generation recognition process, generation structure information is provided to the user of the user terminal 4.

In the process of the user terminal 4, the incidental content transmitter 116 in the content management and editing tool 101 in the music editing and sharing application 100 issues a generation structure enquiry command. The incidental content retriever 114 in the content management and editing tool 101 receives the generation structure information. The incidental content generator 117 in the content management and editing tool 101 displays the received generation structure information on the user interface screen to allow the user to learn the generation structure.

To know the generation structure of the incidental content locally present on the user terminal 4, the user of the user terminal 4 operates the music editing and sharing application 100 to specify the incidental content the generation structure of which the user wises to known. The user then issues an enquiry.

In step S801, the user terminal 4 (music editing and sharing application 100) transmits the content ID identifying the specified content and the generation structure enquiry to the incidental content server 2.

In step S901, the incidental content server 2 waits on standby for the generation structure enquiry from the user terminal 4. Upon receiving the generation structure enquiry, the incidental content server 2 proceeds to step S902.

In step S902, the incidental content server 2 retrieves the content DI received together with the generation structure enquiry. A generation managing unit 25a in a database manager 25 accesses information part of the incidental content indicated by the retrieved content ID out of information part of the incidental content registered when the incidental content database 22a is produced.

In step S903, the generation managing unit 25a performs the generation search process up to the first generation. The concept of the algorithm of the generation search process has been discussed as the generation search of the content γ1 with reference to FIG. 22. In step S903, the editing material content information is referenced in the information part accessed in step S902. The search process starts with the editing material content information. More specifically, by viewing the editing material content information, the database manager 25 can identify the editing material content that is used to produce the incidental content the user has inquired of. The database manager 25 accesses the information part of the identified editing material content, references the editing material content information, and further identifies the editing material content. Such a search process is performed by back-tracking the editing material content to the first generation.

The incidental content server 2 reads and stores metadata contained in the information part of each content by accessing the information part of an older generation in the search process of the editing material content. The metadata thus stored on a per content unit basis is used to generate the generation structure information in a later process.

When all pieces of content up to the primary content responsive to the enquired incidental content are searched in the generation search process, step S903 is completed.

When the generation search process is complete, the generations senior to the enquired incidental content is thus learned as shown in FIG. 22. The metadata of each incidental content and the primary content contained in the generation is also stored.

In step S904 subsequent to step S903, the generation structure information is generated based on the results of the generation search process. In step S905, the generation structure information thus generated is transmitted to the user terminal 4.

In step S802, the user terminal 4 having transmitted the enquiry in step S801 waits on standby for the generation structure information transmitted in response. Upon receiving the generation structure information, the user terminal 4 proceeds to step S803.

In step S803, the user terminal 4 controls a display on the user interface of the music editing and sharing application 100 in accordance with a predetermined mode that allows the user to view the generation structure in an easy-to-understand fashion based on the received generation structure information.

In the process of FIG. 23, the incidental content server 2 performs the generation search process and the generation of the generation structure information at a time in response to the generation structure enquiry as a trigger transmitted from the user terminal 4 (music editing and sharing application 100). The user terminal 4 thus recognizes the generation structure by acquiring the generation structure information transmitted in response.

Alternatively, the user terminal 4 (music editing and sharing application 100) may construct the generation structure information.

In such a case, the user terminal 4 transmits to the incidental content server 2 an enquiry about the editing material content of the incidental content serving as a start point of the generation search. The user terminal 4 then receives a variety of metadata of the editing material content transmitted in response from the incidental content server 2. The user terminal 4 thus acquires the information regarding the editing material content of the incidental content serving as a starting point of the generation search. The incidental content play control file as the incidental content contains the usage editing material content information as the information regarding the editing material content, and the user terminal 4 can directly acquire the required information from the usage editing material content information instead of acquiring through communications with the incidental content server 2.

Based on the information regarding the acquired usage editing material content, the user terminal 4 thereafter acquires the information regarding the usage editing material content information that has been used to produce the usage editing material content, by enquiring the incidental content server 2.

The acquisition of the usage editing material content information through the enquiry is performed to the first generation, namely the primary content. The user terminal 4 acquires the information regarding the usage editing material content through communications with the incidental content server 2. Finally, the user terminal 4 accumulate sufficient information to construct the generation structure information. The user terminal 4 (music editing and sharing application 100) thus constructs the generation structure information and displays the generation structure information on the predetermined user interface screen.

With reference to FIG. 23, the metadata on a per usage content unit basis is stored. This is intended to allow the music editing and sharing application 100 to provide detailed information about the usage-content when the generation structure is displayed. A minimum amount of generation structure information in accordance with one embodiment of the present invention is a content name or a content ID, which indicates what generation the usage content belongs to. Depending on service using the generation structure information and system operation mode, the generation structure information having a minimum or near-minimum amount of information is sufficient.

The search process of FIG. 23 is performed up to the first generation (primary content). Alternatively, the search process may be performed from given incidental content as a starting point to a specified generation.

In practice, there is a possibility that incidental content may be produced within a wide range extending from the first generation to several hundredth generation. If the search range is fixed, the generation search process becomes a heavy load that is imposed to the incidental content server 2. The number of pieces of content forming all generations also becomes enormous. The generation structure information also becomes large in data size, leading to longer transmission time and heavier traffic. Workload also increases on the user terminal 4 for displaying the generation structure information. In view of these considerations, the number of generations to be back-tracked for searching is preferably limited.

If the user terminal 4 simply transmits an enquiry about only the content ID of the incidental content serving as a search start point in the process of FIG. 23, the user terminal 4 may recognize the usage primary content for the incidental content. More specifically, the transmission of the enquiry to the incidental content server 2 allows the user terminal 4 (music editing and sharing application 100) to learn the original editing material (usage primary content) of the incidental content. This means that the usage primary content information is not essential in the metadata as the incidental content play control file. Since the generation search makes a progress allows the incidental content server 2 to learn the editing material content of the incidental content, the usage primary content information is not essential. More specifically, if the incidental content server 2 has a mechanism to acquire and manage the information regarding the editing material content of the incidental content (for example, the user terminal 4 notifies the incidental content server 2 of the editing material content at the uploading), the usage editing material content information and the usage primary content information can be omitted from the incidental content play control file.

The incidental content data (incidental content play control file) and the primary content file data may be modified in structure as appropriate.

For example, the primary content contains the digital audio data as the body thereof. Alternatively, the primary content may have the same data format as the incidental content. More specifically, a creator may produce source sounds as several pieces of digital audio data, performs the editing process on the source sounds handling the source sounds as the editing material contents, and produces a play control file equivalent to an incidental content play control file. The creator then handles a package of the digital audio data as a primary content.

Data for playing the primary content is the data of the play control file.

No specific GUI screen is presented as the music editing and sharing application 100 in the above discussion. A variety of GUI modes may be used for the music editing and sharing application 100.

The primary content server 1, the incidental content server 2, the communication server 3 and the user terminal 4 of FIGS. 6-9 are shown for exemplary purposes only and may be modified or changed as necessary. One of the three servers may be split into a plurality of servers. Conversely, at least two of the three servers may be combined into one.

The music editing and sharing application 100 is not limited to the one discussed with reference to FIGS. 10 and 11. A variety of modifications may be incorporated in the music editing and sharing application 100.

The incidental content play control files are shown in FIGS. 12, 13 and 14 for exemplary purposes only, and a variety of modifications and extensions may be incorporated in each of the incidental content play control files.

The processes, namely program codes, illustrated in the flowcharts of FIGS. 16-19, and FIG. 23 are described for exemplary purposes only and a variety of modification may be incorporated.

The content played by the primary content data and the incidental content data are audio content such as songs. The content may be audio and video content as a moving image. In such a case, data used to play actual content as primary content is video signal data (and audio signal data played in synchronization with the corresponding video signal). The present invention is applicable to still image content such as a photograph or image.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing system comprising an incidental content server and a terminal communicating with each other via a network,
 the incidental content server including:
  incidental content information storage means for storing incidental content information, the incidental content information comprising at least one incidental content able to be played in a primary usage mode and
  direct usage content information indicating at least one direct usage content able to be played in the primary usage mode and able to be used, in a secondary usage mode, in production of incidental content;
 the terminal including:

edit processing means for performing an edit process by using, in the secondary usage mode, at least one content locally present on the terminal, the at least one content comprising a first direct usage content and/or a first incidental content produced based at least in part on the direct usage content;

incidental content information generating means for generating a new incidental content based on a result of editing by the edit process of the edit processing means, the new incidental content referencing, for playback of the new incidental content, at least a portion of the at least one content locally present on the terminal, the new incidental content being associated with source information identifying the at least one content locally present on the terminal;

content information upload control means for causing the terminal to transmit the new incidental content to the incidental content server via the network to store the new incidental content on the incidental content information storage means; and generation search means for searching a parent-child relation of a selected incidental content to identify the direct usage content indirectly used in producing the selected incidental content, the generation searching means searching source information of at least one source incidental content to a predetermined, the at least one source incidental content comprising incidental content directly or indirectly used in producing the selected incidental content.

2. An information processing apparatus comprising:
communication means for communicating via a network;
incidental content information storage means for storing incidental content information, the incidental content information comprising at least one incidental content able to be played in a primary usage mode and produced by an edit process using, in a secondary usage mode, at least one content, the at least one content comprising a first direct usage content and/or a first incidental content produced based at least in part on the direct usage content, and the incidental content information further comprising the direct usage content information indicating at least one direct usage content able to be played back in the primary usage mode and able to be used, in the secondary usage mode, in production of incidental content, each particular incidental content of the at least one incidental content being associated with source information identifying the direct usage content and/or incidental content used in producing the particular incidental content;

storage control means for causing the incidental content information storage means to store first incidental content information in response to reception of the first incidental content information uploaded via the network; and generation search means for searching a parent-child relation of a selected incidental content to identify the direct usage content indirectly used in producing the selected incidental content, the generation search means searching source information of at least one source incidental content to a predetermined generation, the at least one source incidental content comprising incidental content directly or indirectly used in producing the selected incidental content.

3. An information processing method of an information processing system including an incidental content server and a terminal, communicating with each other via a network, the information processing method comprising steps of:

storing incidental content information on an incidental content information storage unit for management, the incidental content information comprising at least one incidental content able to be played in a primary usage mode and the direct usage content information indicating at least one direct usage content able to be played in the primary usage mode and able to be used, in a secondary usage mode, in production of incidental content;

performing an edit process by using, in the secondary usage mode, at least one content locally present on the terminal the at least one content comprising a first direct usage content and/or a first incidental content produced based at least in part on the direct usage content;

generating a new incidental content based on a result of editing by the edit process, the new incidental content referencing, for playback of the new incidental content, at least a portion of the at least one content locally present on the terminal, the new incidental content being associated with source information identifying the at least one content locally present on the terminal;

transmitting from the terminal the new incidental content to the incidental content server via the network to store the new incidental content on the incidental content information storage unit; and searching a parent-child relation of a selected incidental content to identify the direct usage content indirectly used in producing the selected incidental content, the searching comprising searching source information of at least one source incidental content to a predetermined generation, the at least one source incidental content comprising incidental content directly or indirectly used in producing the selected incidental content.

4. An information processing method comprising steps of:
storing new incidental content on an incidental content information storage unit in response to reception of the new incidental content information uploaded via a network, the incidental content information storage unit storing incidental content information comprising at least one incidental content able to be played in a primary usage mode and
the direct usage content information indicating the direct usage content able to be played in the primary usage mode and able to be used, in a secondary usage mode, in production of incidental content, each particular incidental content of the at least one incidental content being associated with source information identifying the direct usage content and/or incidental content used in producing the particular incidental content; and searching a parent-child relation of a selected incidental content to identify the direct usage content indirectly used in producing the selected incidental content, the searching comprising search source information of at least one source incidental content to a predetermined generation, the at least one source incidental content comprising incidental content directly or indirectly used in producing the selected incidental content.

5. At least one recording medium having encoded thereon a computer program that, when executed, causes an information processing apparatus to perform a method for processing information, the method comprising steps of:

storing new incidental content on an incidental content information storage unit in response to reception of the new incidental content uploaded via a network, the incidental content information storage unit storing incidental content information comprising incidental content able to be played in a primary usage mode and produced by an edit process using, in the secondary usage mode, at least one content, the at least one content comprising a first direct usage content and/or a first incidental content produced based at least in part on the direct usage content, and the incidental content information further comprising direct usage content information indicating the direct usage able to be played in the primary usage mode and able to be used, in a secondary usage mode, in production of incidental content, each particular incidental content of the at least one incidental content being associated with source information identifying the direct usage content and/or incidental content used in producing the particular incidental content; and searching a parent-child relation of a selected incidental content to identify the direct usage content indirectly used in producing the selected incidental content, the searching comprising searching source information of at least one source incidental content to a predetermined generation, the at least one source incidental content comprising incidental content directly or indirectly used in producing the selected content.

6. An information processing system comprising an incidental content server and a terminal communicating with each other via a network, the incidental content server including:
an incidental content information storage unit to store incidental content information, the incidental content information comprising at least one incidental content able to be played in a primary usage mode and the direct usage content information indicating at least one direct usage content able to be played in the primary usage mode and able to be used, in a secondary usage mode, in production of incidental content;

the terminal including:
an edit processing unit to perform an edit process by using, in the secondary usage mode, at least one content locally present on the terminal, the at least one content comprising a first direct usage content and/or a first incidental content produced based at least in part on the direct usage content;

an incidental content information generating unit generating new incidental content based on a result of editing by the edit process of the edit processing unit, the new incidental content referencing, for playback of the new incidental content, at least a portion of the at least one content locally present on the terminal, the new incidental content being associated with source information identifying the at least one content locally present on the terminal;

a content information upload control unit to cause the terminal to transmit the new incidental content to the incidental content server via the network to store the new incidental content on the incidental content information storage unit; and a generation search unit to search a parent-child relation of a selected incidental content to identify the direct usage content indirectly used in producing the selected incidental content, the generation search unit searching source information of at least one source incidental content to a predetermined generation, the at least one source incidental content comprising incidental content directly or indirectly used in producing the selected incidental content.

7. An information processing apparatus comprising:
a communication unit communicating via a network;
an incidental content information storage unit to store incidental content information, the incidental content information comprising at least one incidental content able to be played in a primary usage mode and produced by an edit process using, in a secondary usage mode, at least one content, the at least one content comprising a first direct usage content and/or a first incidental content produced based at least in part on the direct usage content, and the incidental content information further comprising the direct usage content information indicating at least one direct usage content able to be played back in the primary usage mode and able to be used, in the secondary usage mode, in production of incidental content, each particular incidental content of the at least one incidental content being associated with source information identifying the direct usage content and/or incidental content used in producing the particular incidental content;

a storage control unit to cause the incidental content information storage unit to store first incidental content information in response to reception of the first incidental content information uploaded via the network; and a generation search unit to search a parent-child relation of a selected incidental content to identify the direct usage content indirectly used in produced the selected incidental content, the generation search unit searching source information of at least one source incidental content to a predetermined generation the at least one source incidental content comprising incidental content directly or indirectly used in producing the selected incidental content.

* * * * *